United States Patent
Lyons et al.

(10) Patent No.: US 10,650,390 B2
(45) Date of Patent: *May 12, 2020

(54) ENHANCED METHOD OF PRESENTING MULTIPLE CASINO VIDEO GAMES

(71) Applicant: Game Design Automation Pty Ltd, Turramurra (AU)

(72) Inventors: Martin S. Lyons, Beaconsfield (AU); Robert Linley Muir, Sydney (AU)

(*) Notice: Subject to any disclaimer, the term of this patent is extended or adjusted under 35 U.S.C. 154(b) by 0 days.

This patent is subject to a terminal disclaimer.

(21) Appl. No.: 15/856,507

(22) Filed: Dec. 28, 2017

(65) Prior Publication Data

US 2018/0247318 A1 Aug. 30, 2018
US 2019/0244218 A9 Aug. 8, 2019

Related U.S. Application Data

(63) Continuation of application No. 12/265,221, filed on Nov. 5, 2008, now Pat. No. 9,858,580.

(Continued)

(51) Int. Cl.
*G07F 17/32* (2006.01)
*G06Q 30/02* (2012.01)

(52) U.S. Cl.
CPC ......... *G06Q 30/02* (2013.01); *G06Q 30/0255* (2013.01); *G07F 17/32* (2013.01);
(Continued)

(58) Field of Classification Search
CPC combination set(s) only.
See application file for complete search history.

(56) References Cited

U.S. PATENT DOCUMENTS 5,643,086 A 7/1997 Alcorn et al.
5,655,961 A 8/1997 Acres et al.
(Continued)

OTHER PUBLICATIONS

"Audit and Control of Mobile Gaming Systems, System Based Games, and System Supported Games," State of Nevada Gaming Control Board, Oct. 30, 2007 [retrieved Feb. 27, 2017], http://gaming.nv.gov/modules/showdocument.aspx?documentid=237, 63 pages.

(Continued)

*Primary Examiner* — Jay Trent Liddle
(74) *Attorney, Agent, or Firm* — Philip H. Albert; Davis Wright Tremaine LLP

(57) ABSTRACT

A system and method for use with a gaming system operating in a casino environment utilizes a plurality of player terminals networked to a game optimisation server. The game optimisation server provides or allows a player to access multiple games on each player terminal and stores in memory a record of the games played on each player terminal 1. A player may access a first terminal and request a map of the casino environment. The first terminal may be a first player terminal or other device connected to the network. The request is sent to the game optimisation server which sends data related to a physical arrangement of the player terminals, and to the games recently played on the player terminals in a local area, to the first terminal. The first terminal displays to the player a map showing the physical arrangement of the player terminals and a game played on each of the player terminals. The map may include an indication of which player terminals 1 are currently being played and which are not being played.

21 Claims, 17 Drawing Sheets

Related U.S. Application Data

(60) Provisional application No. 60/985,982, filed on Nov. 7, 2007, provisional application No. 60/985,985, filed on Nov. 7, 2007.

(52) U.S. Cl.
 CPC ...... *G07F 17/3227* (2013.01); *G07F 17/3239* (2013.01); *G06Q 30/0201* (2013.01)

(56) References Cited

U.S. PATENT DOCUMENTS

| | | | |
|---|---|---|---|
| 6,142,876 A | 11/2000 | Cumbers | |
| 6,612,928 B1 | 9/2003 | Bradford et al. | |
| 6,641,484 B2 | 11/2003 | Oles et al. | |
| 6,758,751 B2 | 7/2004 | Soltys et al. | |
| 6,860,810 B2 * | 3/2005 | Cannon | G07F 17/32 463/20 |
| 6,902,484 B2 | 6/2005 | Idaka | |
| 6,990,217 B1 | 1/2006 | Moghaddam et al. | |
| 7,035,626 B1 | 4/2006 | Luciano, Jr. | |
| 7,048,630 B2 | 5/2006 | Berg et al. | |
| 7,136,875 B2 | 11/2006 | Anderson et al. | |
| 7,175,528 B1 | 2/2007 | Cumbers | |
| 7,187,787 B2 | 3/2007 | Milne et al. | |
| 7,288,025 B1 | 10/2007 | Cumbers | |
| 7,300,352 B2 | 11/2007 | Rowe | |
| 2003/0110038 A1 | 6/2003 | Sharma et al. | |
| 2004/0162144 A1 | 8/2004 | Loose et al. | |
| 2005/0125244 A1 * | 6/2005 | Schneider | G06Q 50/34 705/1.1 |
| 2005/0134685 A1 | 6/2005 | Egnal et al. | |
| 2005/0143169 A1 | 6/2005 | Nguyen et al. | |
| 2005/0171808 A1 | 8/2005 | Saenz et al. | |
| 2006/0066719 A1 | 3/2006 | Haering et al. | |
| 2006/0072010 A1 | 4/2006 | Haering et al. | |
| 2006/0189391 A1 * | 8/2006 | Bird | G07F 17/32 463/42 |
| 2006/0222209 A1 | 10/2006 | Zhang et al. | |
| 2006/0232673 A1 | 10/2006 | Lipton et al. | |
| 2006/0252530 A1 * | 11/2006 | Oberberger | G07F 17/32 463/29 |
| 2006/0262958 A1 | 11/2006 | Yin et al. | |
| 2006/0268111 A1 | 11/2006 | Zhang et al. | |
| 2006/0287098 A1 | 12/2006 | Morrow et al. | |
| 2006/0291694 A1 | 12/2006 | Venetianer et al. | |
| 2006/0291695 A1 | 12/2006 | Lipton et al. | |
| 2007/0013776 A1 | 1/2007 | Venetianer et al. | |
| 2007/0015564 A1 | 1/2007 | Walker et al. | |
| 2007/0052803 A1 | 3/2007 | Chosak et al. | |
| 2007/0054738 A1 | 3/2007 | Muir | |
| 2007/0058717 A1 | 3/2007 | Chosak et al. | |
| 2007/0122000 A1 | 5/2007 | Venetianer et al. | |
| 2007/0127774 A1 | 6/2007 | Zhang et al. | |
| 2007/0203971 A1 | 8/2007 | Walker et al. | |
| 2007/0250898 A1 | 10/2007 | Scanlon et al. | |
| 2008/0254881 A1 * | 10/2008 | Lutnick | G07F 17/32 463/31 |
| 2009/0055205 A1 | 2/2009 | Nguyen et al. | |
| 2009/0117989 A1 * | 5/2009 | Arezina | G07F 17/32 463/20 |

OTHER PUBLICATIONS

"Google AdWords," Google, initial release Oct. 23, 2000 [retrieved Aug. 23, 2017], https://adwords.google.com/home/#, five pages.

"Product List," Tadlys Wireless Communications Ltd., copyright 2004 [retrieved Aug. 23, 2017], http://www.tadlys.co.il/pages/Product_content.asp?iGlobalId=2, one page.

"VeriCode® and VSCode™ 2D Barcodes," Veritec, Inc., copyright 2016 [retrieved Aug. 11, 2017], https://www.veritecinc.com/vericode, five pages.

"Winsock", Wikipedia, the Free Encyclopedia, last modified Feb. 17, 2017 [retrieved Feb. 27, 2017], https://en.wikipedia.org/wiki/Winsock, 5 pages.

Batista, "Tracking Pedestrians Under Occlusion Using Multiple Cameras", International Conference Image Analysis and Recognition, Sep. 29, 2004, 11 pages.

Lyons et al., "Anonymous Player Tracking," U.S. Appl. No. 12/265,260, filed Nov. 5, 2008.

* cited by examiner

ENHANCED METHOD OF PRESENTING MULTIPLE CASINO VIDEO GAMES

CROSS-REFERENCE TO RELATED APPLICATION

This application is a continuation of U.S. application Ser. No. 12/265,221, filed on Nov. 5, 2008, which claims priority to U.S. Provisional Patent Application Ser. No. 60/985,985, filed Nov. 7, 2007, and is related to U.S. Provisional Patent Application Ser. No. 60/985,982, filed Nov. 7, 2007, all of which are hereby expressly incorporated herein by reference in their entirety.

FIELD OF THE INVENTION

The present invention relates generally to casino game selection and more specifically it relates to a enhanced method of presenting multiple casino video games for the effective delivery of a selection of many different games to a player in a casino environment. These games may be developed by multiple providers, and it may not be reasonable to expect a player to be able to easily select from a large selection of competing games.

BACKGROUND OF THE INVENTION

It can be appreciated that game selection has been in use for years. Typically, game selection is implemented on standalone Player Terminals, or Player Terminals that are linked together for bonusing. There are also products that support downloading software from the head system such as new games or bonusing themes—this is commonly known as "system supported", and products that are commonly known as "system based", where game determination takes place at the Game Server end, and the client merely displays the result. See http://gaming.nv.gov/documents/pdf/techstds_05nov17_adopted.pdf (from the Nevada Gaming Commission Technical Standards) for precise definitions of the terms "system supported" and "system based".

The main problem with conventional casino game selection methods are that they are only designed with a few game themes in mind. Players only typically have a choice of 10 or so games to choose from, and the problem of how to adequately allow players to choose from a library of thousands of games has not been addressed. Another problem with conventional casino game selection methods are that although they support open standards that allow third party developers to develop games to be loaded onto the Player Terminals, they provide no method of deciding which games are offered to which players from which providers. Another problem with conventional casino game selection methods are that they provide no means of biasing the games offered to a player so that players are easily able to choose games that they are likely to like. They also have no intelligent way of displaying an idle mode beyond either displaying a set menu of games or the last game that was played at that Player Terminal.

While these devices may be suitable for the particular purpose to which they address, they are not as suitable for the effective delivery of a selection of many different games to a player in a casino environment. These games may be developed by multiple providers, and it may not be reasonable to expect a player to be able to easily select from a large selection of competing games.

In these respects, the enhanced method of presenting multiple casino video games according to the present invention substantially departs from the conventional concepts and designs of the prior art, and in so doing provides an apparatus primarily developed for the purpose of the effective delivery of a selection of many different games to a player in a casino environment, which may be developed by multiple providers, and makes it possible for a player to be able to easily select from a large selection of competing games.

SUMMARY OF THE INVENTION

In view of the foregoing disadvantages inherent in the known types of casino game selection now present in the prior art, the present invention provides a new enhanced method of presenting multiple casino video games construction wherein the same can be utilized for the effective delivery of a selection of many different games to a player in a casino environment. These games may be developed by multiple providers, where it may not be reasonable to expect a player to be able to easily select from a large selection of competing games.

The general purpose of the present invention, which will be described subsequently in greater detail, is to provide a new enhanced method of presenting multiple casino video games that has many of the advantages of the casino game selection mentioned heretofore and many novel features that result in a new enhanced method of presenting multiple casino video games which is not anticipated, rendered obvious, suggested, or even implied by any of the prior art casino game selection, either alone or in any combination thereof.

To attain this, one aspect of the present invention generally comprises of methods capable of modifying the menu of games presented to a player so that the menu as presented is more optimal than a non-ordered menu.

Another aspect of the present invention generally comprises of methods capable of modifying the demonstration or idle mode of games presented to a player to enhance the presentation and/or utility of such demonstration or idle modes.

Another aspect of the present invention generally comprises of methods capable of changing the active game or active game configuration presented to a player so that the changed game or configuration is more optimal than the replaced game or configuration.

Another aspect of the present invention generally comprises of methods capable of presenting a display of available games to a player that is more optimal than prior art.

Another aspect of the present invention generally comprises of methods capable of changing game configuration or game performance based upon promotional considerations.

In an embodiment of these aspects, one or more Player Terminals are used, these Player Terminals being either standalone, system supported or system based, along with a Game Optimisation Server, a user terminal and connection to an external casino management system. For reference, these can be seen in FIG. 1.

In this embodiment, Software methods are installed in each Player Terminal to:
   (a) Communicate with the Game Optimisation Server to indicate when player tracking cards have been inserted or removed
   (b) Optionally, communicate with the Game Optimisation Server to indicate when the Player Terminal is being played or not being played (idle).

(c) Optionally, display a menu of games provided by the Game Optimisation Server along with optional promotional information.

(d) Optionally, download a new game and/or associated configuration settings to the Player Terminal to be displayed to the player. This download to be initiated by either the player or the Game Optimisation Server.

(e) Pass information back to the Game Optimisation Server concerning player activity such as amounts wagered, selections chosen and amounts won.

Software methods are installed in the Game Optimisation Server to:

(a) Optionally, monitor idle Player Terminals and replace the games on these Player Terminals with games that are popular, or being played elsewhere, or have a promotional budget (b) Define the list of games to be displayed by the Player Terminal, including ordering, based on optional criteria such as popularity, relevance to the player, or promotional budget (c) Optionally, associate games with promotional settings, these promotional settings making games more attractive to a player with a corresponding cost to the casino and/or game content provider.

(d) Optionally, aggregate data concerning player activity and pass this on to the casino management system and optionally the game content provider(s). This data may be digitally signed to prevent tampering by the casino operator.

Software methods are installed in the user terminal to (a) Load new game content onto the Game Optimisation Server (b) Associate game content with bids paid by content providers or other parties to influence the order of game display within menus on the Player Terminals.

(c) Associate game content with promotions paid for by content providers, the casino or other parties to make said game content more attractive to a player.

(d) Associate Player Terminals into sets such as banks to allow bids or other rules to only apply to a subset of the whole floor.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a enhanced method of presenting multiple casino video games that will overcome the shortcomings of the prior art devices.

An object of the present invention is to provide an enhanced method of presenting multiple casino video games for the effective delivery of a selection of many different games to a player in a casino environment. These games may be developed by multiple providers, and it may not be reasonable to expect a player to be able to easily select from a large selection of competing games.

Another object is to provide an enhanced method of presenting multiple casino video games that produces an optimal selection of games that are easily accessible for a player from a system-based or system-supported Player Terminal that is capable of player-initiated downloading of new games.

Another object is to provide an enhanced method of presenting multiple casino video games that provides means to enable multiple providers of gaming content that are loaded onto a system-based or system-supported Player Terminal to fairly compete for the right to be preferentially presented to players.

Another object is to provide an enhanced method of presenting multiple casino video games that provides a relevant selection of default games to players such that a player wandering around a casino looking for a game to play is able to instantly see Player Terminals with what appear to be standalone games running a wide and relevant selection of games.

Another object is to provide an enhanced method of presenting multiple casino video games that provide means of allowing providers of gaming content to offer incentives to targeted players to play their games.

Another object is to provide an enhanced method of presenting multiple casino video games that provides a means of allowing providers of gaming content to target groups of players to promote a number of games.

Another object is to provide an enhanced method of presenting multiple casino video games that provides preferential display of games similar or identical to one being played where the Player Terminals adjacent or near the Player Terminal being played are currently idle.

Another object is to provide an enhanced method of presenting multiple casino video games that provides a means for operators displaying promotional or other material on gaming Player Terminals when said Player Terminals are not being played.

Another object is to provide enhanced method of presenting multiple casino video games that provides a means for players to navigate around a casino and to find preferred games, associated persons or other elements of interest.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
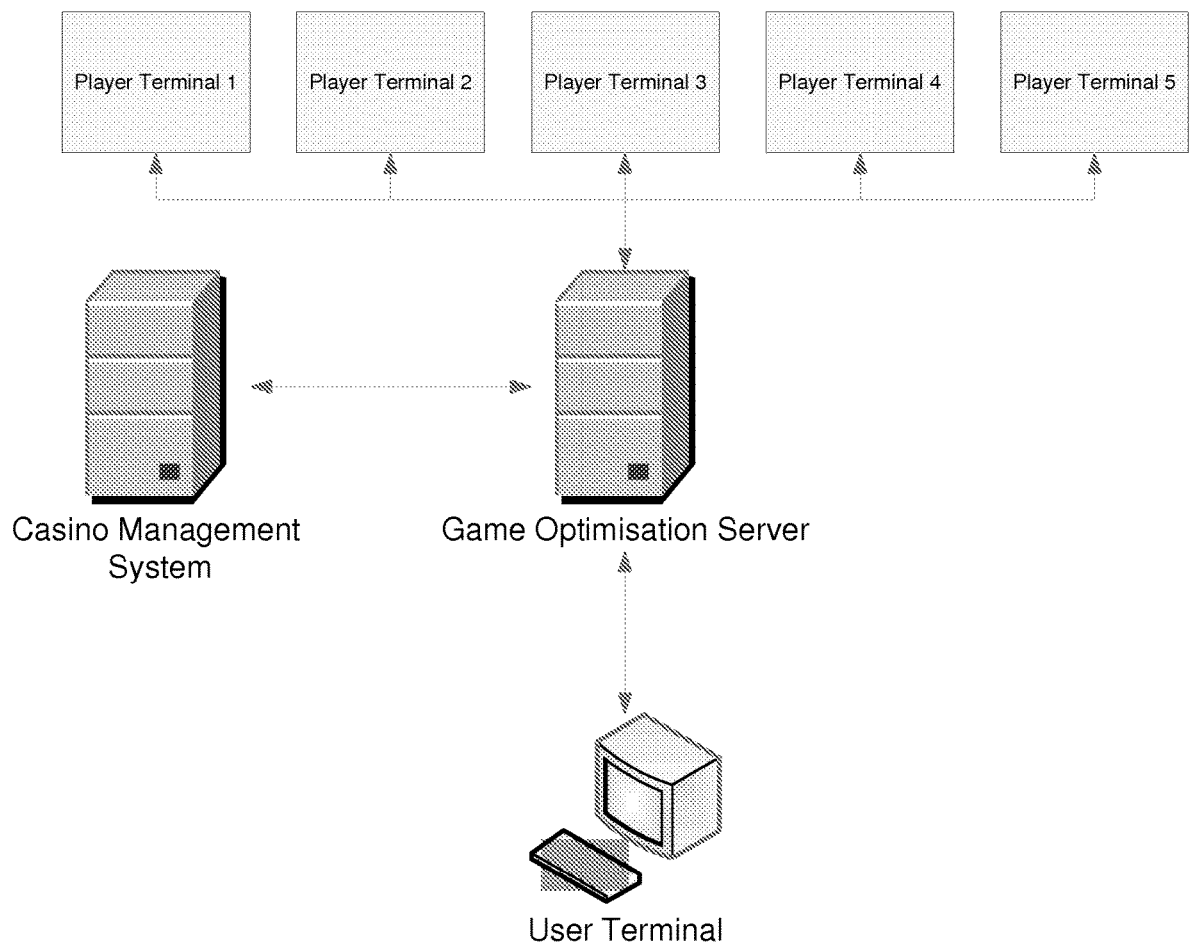
FIG. 1 is a block diagram of a system according to an embodiment of the present invention.

Turning now descriptively to the drawings, in which similar reference characters denote similar elements throughout the several views, the attached figures illustrate an enhanced method of presenting multiple casino video games.

Figure 2:
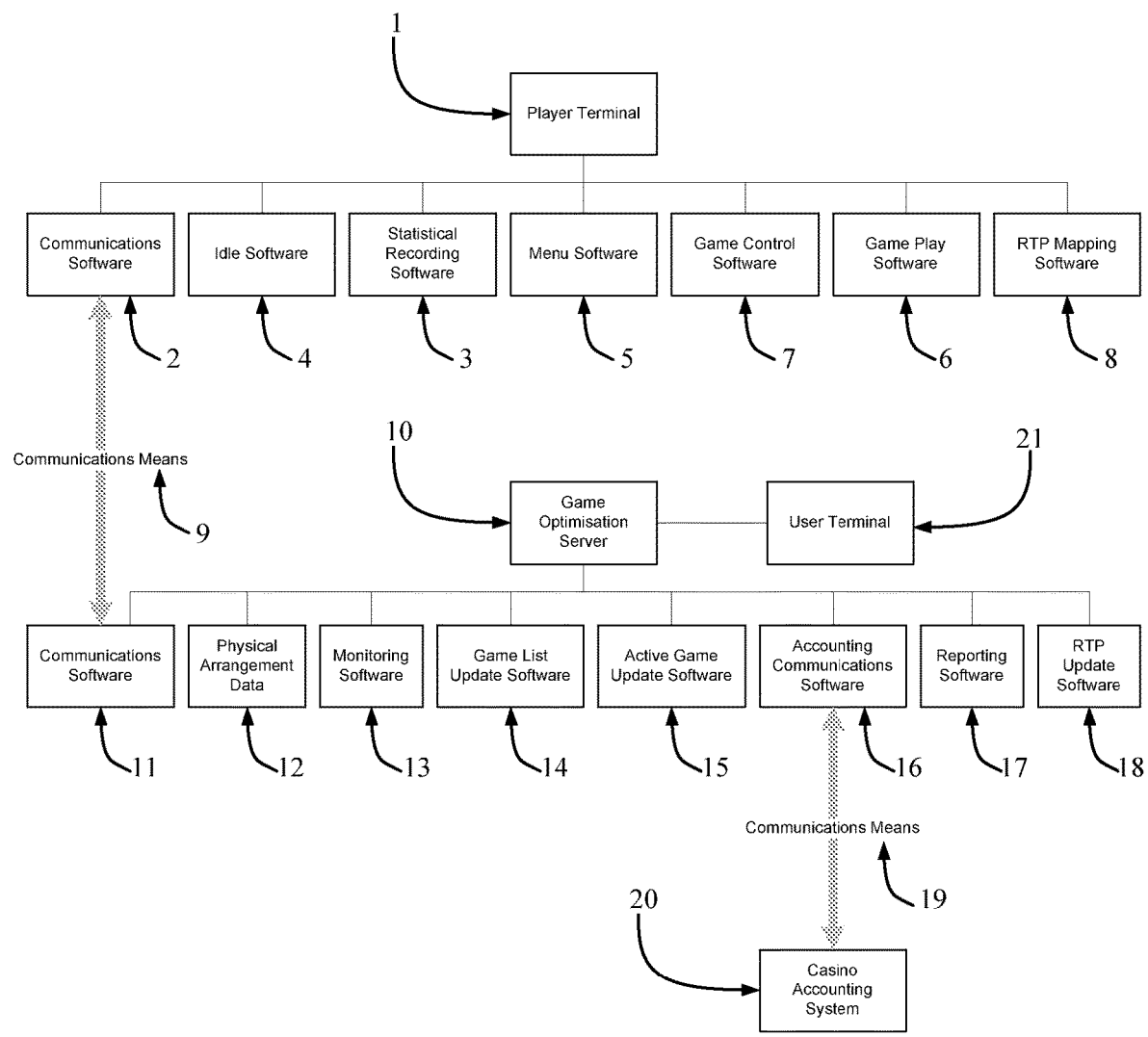
FIG. 2 is an example architecture of the system of FIG. 1.

FIG. 2 shows a preferred architecture which, in brief, comprises one or more Player Terminals (1), these Player Terminals being either system supported or system based. First communication software (2), installed in each Player Terminal. Statistical recording software (3) installed in each Player Terminal. Optionally, idle software (4) installed on each Player Terminal. Optionally, menu software (5) installed in each Player Terminal. Game play software installed (6) on each Player Terminal. Control software (7) installed on each Player Terminal. RTP mapping software (8) installed on each Player Terminal. Connection means (9) between a plurality of Player Terminals and a Game Optimisation Server (10). Communications software (11) stored on the Game Optimisation Server. Physical arrangement data (12) stored on the Game Optimisation Server. Monitoring software (13) installed on the Game Optimisation Server. Game list update software (14) installed on the Game Optimisation Server. Active game update software (15) installed on the Game Optimisation Server. Optionally, accounting communications software (16) installed on the Game Optimisation Server. Optionally, reporting software (17) installed on the Game Optimisation Server. Optionally, RTP update software (18) installed on the Game Optimisation Server. Optionally, connection means (19) between the Game Optimisation Server and a casino accounting or management system (20). A user terminal (21). Each of these components is now described in more detail, again with reference to FIG. 2.

A Player Terminal (1) is a gaming device allowing players to make bets and receive prizes. Typical examples of such devices play games such as video poker, keno and most commonly spinning-reel type games. For the purposes of this invention, it is preferred that the Player Terminal has at least one video display which presents graphical elements to the player such as gaming symbols, play line indicators and metering information describing the outcome of a bet. Player Terminals generally have input means for the player to interact (e.g. to place a bet or retrieve their winnings). For the purposes of this invention it is preferred that the input means include a touchscreen or other software-controllable input such that a player may select from a non-static selection of games (which would be the case if the only input was a set of discrete physical buttons with printed labels). In an alternative implementation of this method, the player terminal may simply be a standard PC or home game console, connected to the Game Optimisation Server by communication means such as the internet. In yet another alternative implementation of this method, the Game Optimisation Server and Player Terminal software exist within one gaming device.

The communication software (2) is installed in each Player Terminal. It communicates with software on the Game Optimisation Server, and receives commands from the Game Optimisation Server. The communications software is a software module that interfaces to the communications hardware via standard application programming interfaces (APIs) such as Winsock (see http://en.wikipedia.org/wiki/Winsock), Microsoft .NET communication methods or BSD style sockets. When the Player Terminal boots up it initalises this software, and during this initalisation process, the software establishes a communication link with the Game Optimisation Server. At this point the software waits to receive commands from the Game Optimisation Server. These commands, when sent by the Game Optimisation Server, are passed on to other software modules in the Player Terminal. For example, one such command is to change the active game. Upon receiving this command, the software passes the command to the game control software which switches the active game by means of unloading the current game and loading the specified game from local storage or the network. Another such command is to receive an updated list of active games from the Game Optimisation Server. Upon receiving this command, the list of active games stored on the local Player Terminal is updated, for immediate or later display by the game menu software. Yet another command is a request for game statistics. This command causes the communication software to retrieve the statistics recorded in the Player Terminal and transmit them to the Game Optimisation Server. The communications software may also be built to use serial protocols rather than ethernet based protocols. The communications protocol may also be optionally initiated by a poll by the Game Optimisation Server rather than by the Player Terminal initiating the connection. Also, once established, commands may be retrieved by a poll by the Player Terminal rather than by a command sent by the Game Optimisation Server to a listening Player Terminal.

The statistical recording software (3) is installed in each Player Terminal, and records statistical data relating to play. It stores this data until the communications software retrieves it, at which point it is optionally deleted. The data that is recorded may include: (a) the amount bet and won by a player for each game played, (b) the game menu selections made by a player, (c) the player tracking identification number associated with the player making selections/bets, (d) the time that a particular game has been active.

The idle software (4) is installed on each Player Terminal, to display an idle or demonstration mode, capable of displaying notable characteristics of a game to a passing player such as the game name and game features. The idle software monitors play at the Player Terminal. After a keypress or other input such as a coin deposit, a time counter begins. Any further input cause the counter to reset to zero. If the counter reaches a pre-determined value (say, 5 minutes) the software signals the operation of the Player Terminal to enter idle mode until a further keypress or other input occurs. Once a Player Terminal enters or finishes idle mode, it passes this information to the communications software (2) which in turn passes the information onto the Game Optimisation Server. During idle mode, the Player Terminal displays advertising or promotional material. Conventionally, this material has been directly related to the game currently loaded on the Player Terminal, but this invention allows that the material be related to other games or other material as directed by the Game Optimisation Server. This material could take the form of advertisements for casino events or promotions, for example to promote a "2-for-1 offer" in the casino restaurant. Or it could promote another game by the same content vendor or by another content vendor depending upon the instruction from the Game Optimisation Server.

The menu software (5) is optionally installed in each Player Terminal, and displays the list of active games that have been previously communicated by the Game Optimisation Server to the Player Terminal.

Figure 3:
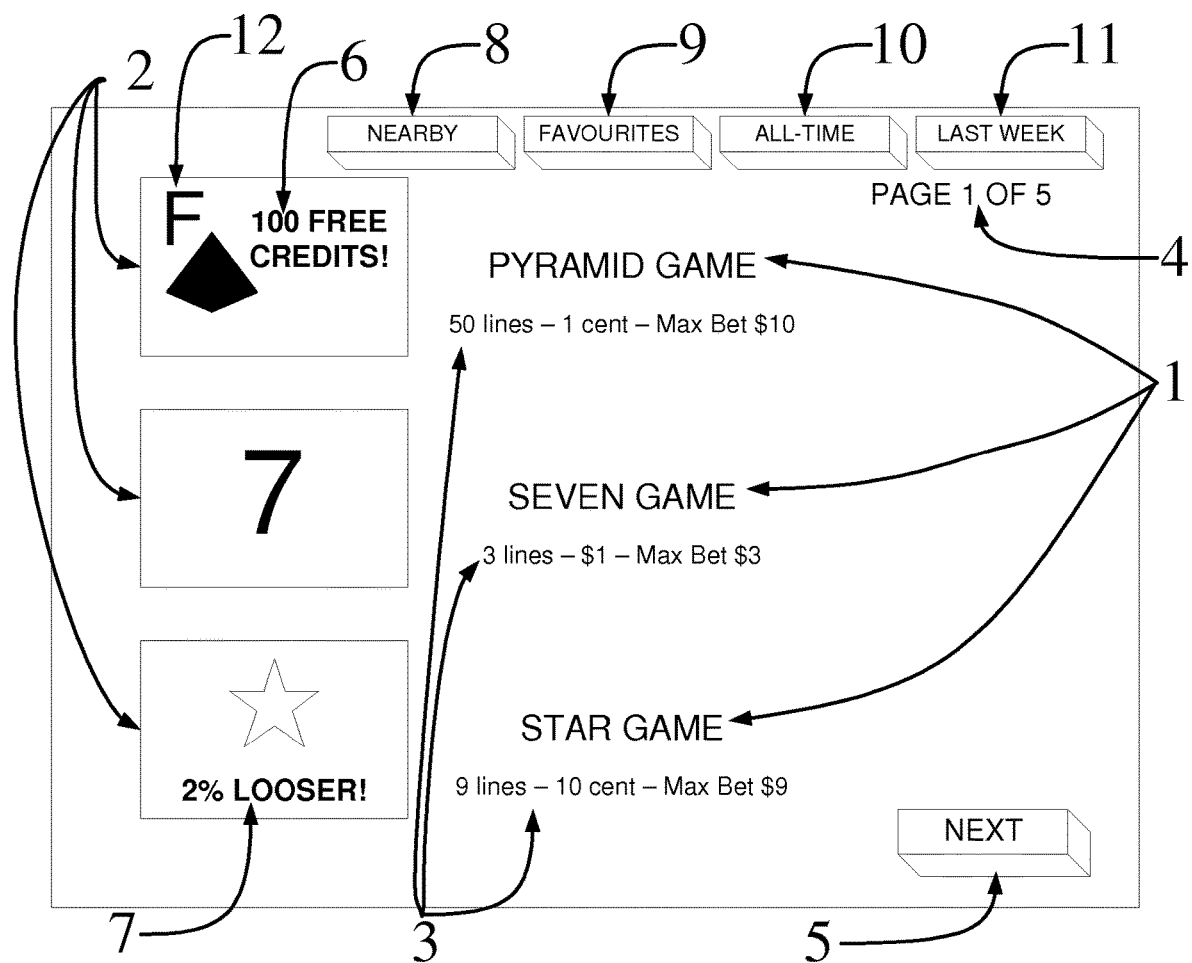
FIG. 3 is an example game list menu display page presented to the player, according to an embodiment of the present invention.

This list is presented to the player and an example of such a presentation is shown in FIG. 3. The list is initially sent by the Game Optimisation Server during the communications initialisation sequence of the Player Terminal. With reference to FIG. 3, each entry in the list describes the game (1), preferably with the aid of a suitable graphical image (2), and preferably with other characteristics that may be of interest to the player such as the range of denominations that the game accepts, and the number of play lines/maximum bet (3). This list may contain an ordering factor that determines the order of each entry to be displayed on the menu screen. The software displays this list, splitting if necessary across multiple menu pages (4) if the list is too long to be displayed on one screen. Optionally, the number of games to be listed on each menu page is specified along with the list, alternatively the number of games to be listed on each menu page is determined by the number of maximum possible game titles that can be displayed, given the size in pixels of each game title and the size in pixels of the menu page. Navigation buttons are provided for the player to switch between pages of games when the number of games to be displayed must be split across pages (5). Game promotions may be associated with each menu entry—the details of which are sent with the game list from the Game Optimisation Server—and these promotions could include free credits for the player (6) or an increase in RTP (return to player) (7). Eligibility for these promotions may be restricted to certain qualifying players, described later in this document. A series of buttons may also be presented to the player to filter the number of games shown in the list or to move between modes of the list. In the example shown, there is a button to show the games being played nearby (8) at the moment, which is useful for a player when they see a game being played that they like, as all they have to do is go to a nearby Player Terminal and press "nearby" to quickly obtain that game. Another button (9) allows a player to access their favourites—games they have chosen, and games that they have played often or recently. A further button (10) allows a player to see the games that have been popular the most in the casino, this list maybe configured to be responsive to the player's play characteristics. A further button (11) allows a player to see the games that have been popular over a recent time period—in this case a week. Again, this list may be configured to be responsive to the player's play characteristics. A final characteristic of this example display is the 'F' notation (12) attached to one of the games. This indicates that the game is a favourite, and will appear in the favourites list. A player may activate or de-activate this indication by a user input such as holding their finger down on the game graphical image.

Returning to the architecture shown in FIG. 2, the game play software (6) is installed on each Player Terminal, and presents the active game to the player, This includes taking input from the player, such as bets, and displaying the result of the bet. Optionally this software contains an RNG and means of determining a game result—this is a "system supported" game. Alternatively, the RNG and game determination part of this software take place on the Game Optimisation Server, and the Player Terminal software merely displays the result—this is a "system based" game. In both cases there is optionally a set of configuration settings associated with the game that, when changed, adjust the percentage of money bet on average that is returned to player (RTP). This software module is loaded by the game control software on either the Player Terminal or the Game Optimisation Server from either local storage or over the network from a central storage server. In the case of a system supported or standalone game, each input event or game result event is passed to Monitoring Software on the Game Optimisation Server via the communication software. In the case of a system based game, some of these events (e.g. game results) may be generated within the Game Optimisation Server and passed via some kind of inter-process or inter-thread communication. In addition, events indicating idle or play time may be passed to the Monitoring Software on the Game Optimisation Server. Optionally, the Player Terminal may include software or hardware (such as a smartcard) to support digitally signing these events before passing them to the Game Optimisation Server. These signatures would thus be passed alongside the event data to the Game Optimisation Server. Signed events would thus be stored in the Game Optimisation Server database, and would be available for transmission to $3^{rd}$ party content providers. This would help prevent any accounting fraud at the Game Optimisation Server or casino management system, as any fraud would require modifying all of the Player Terminals connected to the Game Optimisation Server rather than simply the Game Optimisation Server. In other possible implementations, digital signing, either software or security hardware supported, would take place at the Game Optimisation Server.

The control software (7), in the case of system-supported games, is installed on each Player Terminal to control game operation. This software is passed commands by the communications software (2) to change the active game. In the case of system-based games, this software may also be installed in the Game Optimisation Server. Upon receiving such a command the current game is halted (subject to regulatory requirements being met) and in its place is loaded the game described in the command. In the case of system-supported games, this may entail loading a new game package, in the case of system-based games, this may only entail the loading of new graphics and associated data. Optionally, these game change commands may also cause this software to set the RTP of either the current or new game by means of accessing the RTP software.

The RTP mapping software (8), in the case of system supported games, is optionally installed on each Player Terminal to control the RTP. In the case of system based games it is optionally installed on the Game Optimisation Server. It receives a command from the control software indicating a desired RTP (e.g. 85%) and configures the game software to meet this RTP by changing game configuration settings such as paytable or reel strips.

The connection means (9) between the plurality of Player Terminals and a Game Optimisation Server allows the communication software at the Player Terminals and the Game Optimisation Server to successfully communicate. The connection means may be over physical or wireless networks using previously known technology such as ethernet and TCP/IP. Optionally, the Game Optimisation Server and Player Terminals may communicate over a large distance by means of WAN (wide-area-network) protocols.

The Game Optimisation Server (10) is preferably comprising of standard PC style hardware including network connectivity (such as ethernet or wireless), storage (both RAM and hard-disk based) and capability of running software. It is anticipated that, depending upon the size and geography of the installation, the Game Optimisation Server may be multi-tiered. Such a multi-tier setup would allow this invention to be implemented across multiple casinos with the benefit that bids/promotions/player profiles could be shared across these multiple venues.

The communication software (11) is installed in the Game Optimisation Server. It communicates with software on each Player Terminal (2), and passes commands from other software modules installed on the Game Optimisation Server. The communications software interfaces to the communications hardware via standard application programming interfaces (APIs) such as Winsock (see http://en.wikipedia.org/wiki/Winsock), Microsoft .NET communication methods or BSD style sockets. When the Game Optimisation Server boots up it initalises this software, and then waits for Player Terminals to establish communications. At this point the software adds the Player Terminal to its internal list of active Player Terminals, along with details concerning the location of the Player Terminal obtained from the physical arrangement data (12) for interrogation by other modules. The communication software then waits for commands to be passed to it by other software modules in the Game Optimisation Server. Once received, these commands are sent over the communication means (9) to the indicated Player Terminal. The communications software may also be built to use serial protocols rather than Ethernet based protocols. The communications protocol may also be optionally initiated by a poll by the Game Optimisation Server of known Player Terminals or a broadcast method such as multicast rather than by the Player Terminal initiating the connection. Also, once established, commands may be retrieved by a poll by the Player Terminal rather than by a command sent by the Game Optimisation Server to a listening Player Terminal.

The physical arrangement data (12) is preferably stored in a database either within or attached to the Game Optimisation Server. The data consists of location co-ordinates for each Player Terminal, along with relationship tables that order each Player Terminal with respect to its physical neighbours. This enables the game list and game update software on the Game Optimisation Server to perform queries to find Player Terminals that are adjacent or close to a particular Player Terminal. Additional queries that can be performed on this data include finding all Player Terminals connected together in a physical arrangement such as a bank of Player Terminals.

The monitoring software (13) is installed on the Game Optimisation Server. It receives data relating to play from each Player Terminal attached. This data is aggregated and stored in a database, and passed onto the Casino Management System and reporting system if required. The operation of this software is described in some detail below.

The game list update software (14) is installed on the Game Optimisation Server and is capable of generating and sending an updated list of available games to all, or some subset of, the connected Player Terminals. The operation of this software is described in some detail below.

The active game update software (15) is installed on the Game Optimisation Server and is capable of sending commands to update the active game on one or more of the connected Player Terminals. The operation of this software is described in some detail below.

The accounting communications software (16) is installed on the Game Optimisation Server and takes as an input the database that is generated from game play performance. It passes relevant parts and aggregates of this data onto the Casino Management System.

The reporting software is installed on the Game Optimisation Server (17), and takes as an input the database that is generated from game play performance. It generates reports from this data for the purpose of providing content providers with information about their game's performance, and also for the apportioning of revenue. These reports may include portions of the raw event data, digitally signed by the Player Terminal, as described above in the game play software (6).

The RTP update software (18) is installed on the Game Optimisation Server and is capable of sending commands to update the RTP on one or more connected Player Terminals. In the case of system-based games, it communicates the updated RTPs via inter-process or some other type of communication to software modules present on the Game Optimisation Server.

The optional communication (19) between the Game Optimisation Server and the Casino accounting system may be over physical or wireless networks using previously known technology such as ethernet and TCP/IP.

The casino accounting (20) or management system is external to the scope of this invention. It contains information about each player that inserts a player tracking card into the Player Terminals and receives play data from the Game Optimisation Server such as bet and win amounts. In one implementation, the casino management system provides the Game Optimisation Server with a unique identification code for each player tracking card currently associated with a Player Terminal connected to the Game Optimisation Server. In another implementation, this code is read by the Player Terminal directly and passed onto the Game Optimisation Server, optionally being further passed onto the casino accounting system.

The user terminal (21) allows an operator to interact with the Game Optimisation Server, performing configuration actions or retrieving information. The operation of this component is described in further detail below.

It should also be noted that in system-based game operation it is not necessary that the Game Optimisation Server perform the functions of the system portion of each game, nor for it to act as a server for game data or files. These functions could be provided by one or more separate servers.

OPERATION OF THE PREFERRED EMBODIMENT

Turning now to how the above components operate together, the first operation performed by this invention takes place in the game list update software.

The game list update software maintains a set of 'bid lists'. There may be one or more of these lists, and in certain situations it is possible there may be none.

Figure 4:
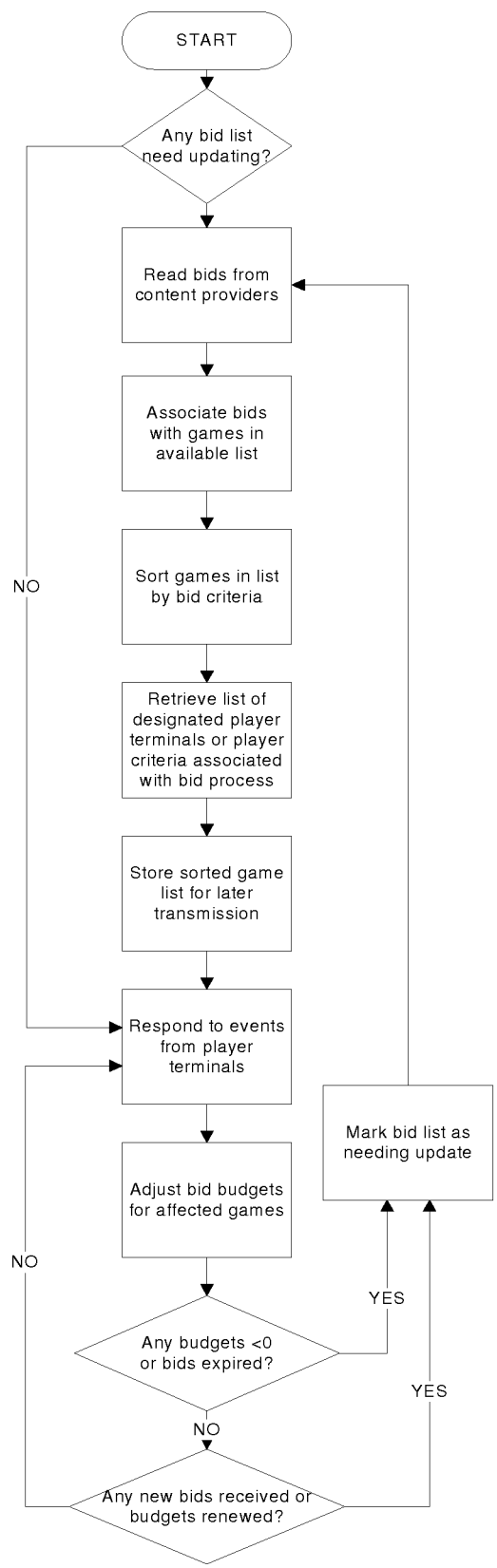
FIG. 4 is an exemplary Game Optimisation Server Bid Lists Process Update, according to an embodiment of the present invention.

The creation and update of a bid list is described in FIG. 4, and this description should be read with FIG. 4 in mind.

A bid list may be a list of bids provided by content providers for the promotion of their content. A unique aspect of this invention is that it anticipates that a system-supported or system-based gaming system may have hundreds or thousands of games available for a player to play. It is also anticipated that there may be more than one content provider developing or promoting games on the system, and as such there needs to be an effective way for a provider of a new game to promote that game to players. The bid list is one such way.

In its simplest term, an entry in the bid list may consist of a unique identifier for a game along with two amounts—a per-bid amount, and a budget amount. In the following description, examples are given where these amounts are monetary values, although it is possible and even preferable that virtual currencies or alternative methods of accounting could be used. In situations where this invention is used for the automatic optimisation of game menus, the amount would simply be in units of points. It is also possible that the conversion rate from bid amounts to real money amounts may not be fixed. An operator may choose to give a preferred supplier a discount on bid rates against other suppliers. Adjusting the conversion rate outside of the Game Optimisation Server is a simple way of doing this.

The budget amount may be replaced with, or be in addition to, a time value which sets an expiry time on the bid.

In addition to these values, a bid list entry may also include parameters which make the bid only active upon certain criteria being met. Furthermore, the bid list itself may only be active upon certain criteria being met. An example of this may be to restrict the bid list to a subset of the Player Terminals on the floor. In this way, bids contained in the list only influence the menu display of Player Terminals designated in a table attached to the list. An example of the appropriateness of this would be to have a set of games designed for 'high rollers', with very large denominations (e.g. $100 per hand of video poker). Player Terminals in the 'high roller area'—a cordoned off area of the casino or separate room—would only receive bid lists containing games designed for very large denominations. It is a feature of some types of game that the denomination of the game can be varied, either by player or by the operator. In the case of high roller games, each Player Terminal in that designated area may receive a control signal from the Game Optimisation Server or casino management system to limit denomination selection to a suitably high value.

In the case where there is only one entry in the bid list, during game list update this entry will cause the game identified by the entry to be placed at the top of all games listed in the Player Terminal game list menu, subject to other games not taking priority for reasons listed below.

In the case where there is more than one entry in the bid list, the order of display in the Player Terminal game list menu will be determined by the bid amounts associated with each entry—a higher bid leads to the corresponding entry in the game menu being placed in a more prominent position.

By way of an example, taking the example game list menu display shown in FIG. 3, let us assume that "Pyramid Game" was produced by a first content provider, "Seven Game" was produced by a second content provider and "Star Game" was produced by a third content provider. Let us also assume that the first content provider bid $1 for "Pyramid Game", the second content provider bid 50 c for "Seven Game", and the third content provider bid 10 c for "Star Game". These bids would produce the ordering shown in FIG. 3 and would be presented as such to a player. This ordering assumes that a player will naturally read a menu of games from top to bottom, although other orderings could be used—for example it may be advantageous to place the game with the highest bid entry in the middle of the screen, maybe with a highlighted emphasis such as a larger or brighter font, or any other method of drawing attention to the highest bid.

The example shown is quite simple. It is a feature of this invention that as the number of entries in a game menu increases, the bidding process becomes more important because it is not feasible to display more than a small number of game choices on one video display. If, for example, the maximum number of game display entries that can be displayed on a video display is 3, and there are 300 games available for play, then it is apparent that there would need to be 100 pages of potential menus that a player would have to navigate to find a specific game. A bid that places a game on the first few pages would therefore be much easier to find. Another aspect to note is that in such a configuration, the difference between a game having the $3^{rd}$ highest bid, and the $4^{th}$ highest would make the difference between being shown on the first menu page or the second, regardless of the format of the menu display.

Once a bid list has been compiled, it is stored for use by the designated Player Terminals or by all Player Terminals if no table is attached to the list.

The bid list is then updated in response to trigger events, usually generated by the Player Terminals displaying the game list menu derived from the bid list, but possibly by other means such as a timer event generated by the Game Optimisation Server. This response process in FIG. 4 is expanded upon in FIG. 5 and is now described in more detail with reference to FIG. 5.

There are a number of events that could be generated by either the Player Terminal or Game Optimisation Server. In the preferred embodiment, three possible events are implemented:

a) A time event
b) A game play event
c) A menu event

A time event is triggered by the completion of a time interval. An example time interval might be "1 hour". In the context of this process, the interval describes the time that the bid has been active and thus affected the output of the game menu list. So, continuing the example, and with reference to FIG. 3, a content bid provider may have bid $10 per hour to have the "Pyramid Game" displayed on the game list menu. The total budget they may have applied for this is $1000, so this means that so long as no other content provider bids higher than $10, the "Pyramid Game" would be displayed at the highest position on the game menu list for 100 hours.

Alternatively, using the same figures, the system could be initialized so that there would be a maximum of 5 hours a day that a bid could be active. So the "Pyramid Game" would be displayed for 5 hours a day at the highest position, and with a budget of $1000, this would occur for 200 days. All this assumes, of course, that no other bid in the meantime usurps the bid of $10. If at any time there is a larger bid, then for the duration of the larger bid the "Pyramid Game" would be displayed at the second highest position.

It is also possible that a content provider may put restrictions on the availability of their bid. They may wish to only bid for peak periods—say 8 pm to 10:30 pm. In this case their budget of $1000 would last for 400 days, as the budget would be decreased by $25 each day.

Figure 5:
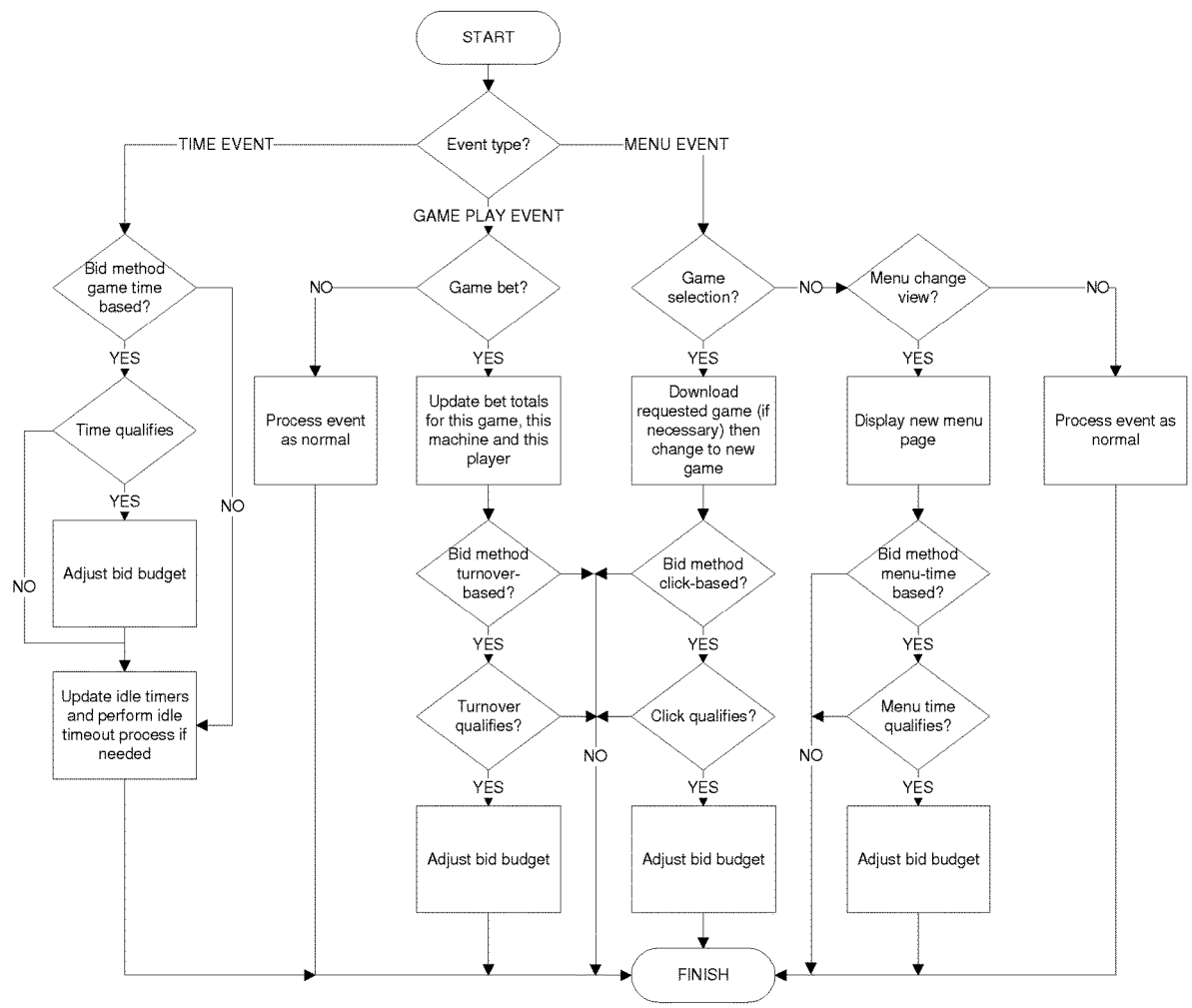
FIG. 5 is a flow diagram of an exemplary Responding Process to events from Player Terminal, system according to an embodiment of the present invention.

Turning to FIG. 5, we see that a time event arriving at the Game Optimisation Server causes the Game Optimisation Server to first evaluate if time events are active. If not, the time event is passed onto other processes (e.g. idle Player Terminal management—see below). If time events are active, then the time value is evaluated to see if it is greater than the expiry time of any of the interval values of the bids in the list. So, for example, if the bid list was updated to include a bid of 50 c for the "Star Game" at 5:30 pm, and the bid was active from that point onwards, if the interval value for the list is 1 hour, then a time event at 6:30 pm would cause the initial bid value for "Star Game" to expire, causing the bid budget for "Star Game" to be adjusted. If, for example, the bid budget was initially $20, it would thus be now reduced to $19.50. Furthermore, if the bid budget was $0, then the bid would be removed from the bid list, and the game list menus would be updated on all affected Player Terminals the next time they are retrieved from the Game Optimisation Server.

Once any needed bid budgets are updated, time event processing continues with other actions such as idle Player Terminal management (see below).

It's important to note that the time interval could be specified as being across all Player Terminals associated with the bid list, or just one Player Terminal. In the case of all Player Terminals, the time interval indicates a length of time during which all the associated Player Terminals will display the game at its position in the game menu list. A time interval per Player Terminal, however, indicates a time divided across all associated Player Terminals. So if the bid is for 5 hours, and there are 10 Player Terminals associated, then the effective time would be 30 minutes. Such a method is useful when the number of Player Terminals associated is a variable that can change during the existence of the bid—if the number of Player Terminals were to temporarily reduce during the bid existence, the length of the time allocated to each bid would thus increase, which would compensate for the smaller amount of Player Terminals acting upon the bid.

A second possible trigger event seen in FIG. 5 could be a game play event such as a player initiating a bet to start a round of a game. In response to this, the Player Terminal would, as normal, start the game by spinning reels, or displaying playing cards or whatever else describes the game to the player.

In this process, the Player Terminal would furthermore pass the game play event information back to the Game Optimisation Server. This information might include the amount bet, the play configuration chosen (e.g. the number of play lines active on a spinning reel game), an identification code for the player (possibly extracted from the player tracking card interface attached to the casino management system), an identifier for the game and also the result of the bet, in terms of prize won. It may also include extra information that may be useful such as the time spent between bets (which could indicate that the player is not comfortable with this game, if the time is much more than from other games with the same player), help screens that are being accessed (this data could be aggregated to inform an operator or content provider about a game difficulty, or could be directly reported back to an assistant to walk over and help the player if needed), or any other data relating to game play.

This information can be used by the Game Optimisation Server to qualify players for certain bid lists (see below) and to indicate performance of a Player Terminal or game content. It can further be used to share revenue with a content provider by keeping a running total on all moneys received from a player (both gross, and net of winnings). Furthermore, in the case where prizes are won, it can be used to decide whether a win qualifies to be paid by the content provider (in part, or in full) rather than the casino operator.

After updating the accounting data, the Game Optimisation Server evaluates the bid list active on the Player Terminal where the game play event was received from. If the bid list has a turnover based component for each bid, and the active game on the Player Terminal is associated with an entry in the bid list then the turnover is analysed to see if it qualifies for the budget to be adjusted.

An example of how this could work will make the process clear.

With reference to FIG. 3, a content bid provider may have bid that the "Pyramid Game" would have an expected net return to the casino of $100 per hour if it is displayed on the game list menu. The total budget they may have applied for this is $1000. If no other content provider bids higher than $100, the "Pyramid Game" would be displayed at the highest position on the game menu list (as before, if a higher bid exists, then "Pyramid Game" would appear in the game menu list at the position indicated by the ranking of its bid) for at least 10 hours. However, this period could be much longer. Continuing the process of FIG. 5, and assuming that "Pyramid Game" is the active game on a Player Terminal associated with the bid list, the turnover is analysed.

If the turnover meets the bid criteria (i.e. more than $100 has been returned to the casino over the past hour) then no adjustment to the "Pyramid Game" budget is necessary. If turnover has not met the bid criteria, and, for example, only $75 has been returned to the casino over the past hour, then an adjustment is made to the bid budget. In the simplest implementation, the difference between the bid ($100) and the actual return ($75) is subtracted from the budget, leaving a new balance of $975 in the budget. If game performance continued on at a similar rate, it can be seen that the bid budget would be exhausted in 40 hours (at $25 an hour) rather than 10 if there were no net return to the casino during play. It can also be seen that for every hour that the return to the casino is met, that the budget is not decreased, and thus the bid remains in the list indefinitely.

As noted above, it is an important feature of this invention that these amounts may not in fact be 'real' amounts of money, but virtual currency enabling a virtual marketplace of game performance. This has the potential of producing complex optimisations of the casino floor. Nor need there be any third party content provider—the casino operator could use this invention to maintain their floor by placing virtual bids for new games as they appear on the floor, and then leaving the system to reach equilibrium for each game in terms of its placement within the game list menus.

Basing the bid criteria on the net return to the casino is also only one possible variation of this method. The net return may be based on actual return (i.e. losses-wins), theoretical return (i.e. the mathematical derived % that the game is expected to return, rather than actual day-to-day performance) or on other factors such as average bet, minimum bet, total bet per time interval or some combination of these factors. A minimum bet criteria would not need to have a time based component as each player bet could be instantly compared against the criteria, and the bid budget adjusted if needed.

Average and total bet criteria would have a time-based component, and like return-to-casino criteria, would span across multiple sessions and multiple Player Terminals. As in the time-based criteria described above, rather than measuring time across all Player Terminals, the time would be divided between associated Player Terminals. For example, if it is known that "Pyramid Game" has an average play-time of 5 seconds then it is simple to derive that 720 games would take a time of one hour. Therefore, bid criteria based upon one hour would trigger an evaluation of average bet or turnover after 720 games being played, irrespective of how many different Player Terminals or sessions were involved in the 720 games. It can also be seen by this that an alternative to a time-based component would be to use a quantity of games played, or bets made instead.

As with time-based criteria, game play event criteria could be limited to certain times of days, certain players or certain Player Terminals. These qualifying criteria will be discussed in detail below.

A third possible trigger event seen in FIG. 5 could be a menu event, caused by a player's actions whilst operating the game list menu.

The first possible menu trigger event would be that of a player selecting a game to play. This immediately causes the game to be downloaded to the Player Terminal being played (if has not already been pre-loaded in advance) Also, it causes the Game Optimisation Server to evaluate if the Player Terminal at which the game is to be played is associated with a bid list, and if the game is present in an entry in said bid list.

If these criteria are met, and the method associated with the bid list is based upon player 'click-throughs' then the budget associated with the game entry in the bid list is adjusted accordingly. Again, an example will make this process clear.

With reference to FIG. 3, a content bid provider may have bid every time a player selects the "Pyramid Game" from the game menu list, $10 is to be deducted from the "Pyramid Game" budget. The total budget they may have applied for this is $1000. If no other content provider bids higher than $10, the "Pyramid Game" would be displayed at the highest position on the game menu list. Again, as before, if a higher bid exists, then "Pyramid Game" would appear in the game menu list at the position indicated by the ranking of its bid. In the simplest implementation, this deduction would occur whenever any player at any Player Terminal associated with the bid list selects "Pyramid Game". A budget of $1000 would mean that this could occur 100 times before the bid budget is depleted.

Such an implementation would also probably have a time-based replenishment component. So a content provider could bid $10 per selection and $100 per day, which would ensure that "Pyramid Game" would appear at the top of the game menu list until 10 players selected it, whereupon it would not appear at the top until the next day.

More sophisticated implementations could be based around this method. Firstly, bids may only be deducted from the budget for unique selections—if a player is identifiable through the casino management system, a bid may only be deducted for the first time they select a game, or maybe only the first time they select a game in a day, a distinct session (i.e. only once per card per Player Terminal) or other time period. Furthermore, game selection bid deductions may be adjusted or ignored if performance of the player warrants it—so if a player selects a game and then proceeds to produce significant real or theoretical return to the casino the budget associated with the game bid may be adjusted less or not at all.

In scenarios where bids are automatically generated by the casino based upon game popularity (see popular game discussion below), strong player performance may cause the actual bid amount and/or bid budget to be increased. For example, a game performing above a certain threshold—say, for example, taking much more money for the casino than the floor average—may cause a positive adjustment to its bid amount, along with a potential increase to its budget. Such performance may be monitored and periodically adjusted so that as game performance changes, this is reflected in the bid amount.

Another possible menu event could be triggered by a player changing the menu page, or by exiting the game menu selection (maybe by selecting a game, but also by other selections such as "return to previous game").

In this case, each bid would consist of an amount associated with a time value, along with an overall budget. Unlike the time event bid described above, the time value would be based upon the time that the player is displayed the bid entry on the game menu list screen. Switching to another menu page, or in any way away from the game menu list screen containing the bid entry would stop the time value increasing. Alternatively, the bid could consist of an amount associated with one viewing of a menu page, with no time value. An example will make this process clear.

With reference to FIG. 3, a content bid provider may have bid that every time a player is shown the "Pyramid Game" in the game menu list, $10 is to be deducted from the "Pyramid Game" budget. The total budget they may have applied for this is $1000. If no other content provider bids higher than $10, the "Pyramid Game" would be displayed at the highest position on the game menu list. Again, as before, if a higher bid exists, then "Pyramid Game" would appear in the game menu list at the position indicated by the ranking of its bid. In the simplest implementation, this deduction would occur whenever any player at any Player Terminal associated with the bid list is shown "Pyramid Game". A budget of $1000 would mean that this could occur 100 times before the bid budget is depleted.

Such an implementation would also probably have a time-based replenishment component. So a content provider could bid $10 per view and $100 per day, which would ensure that "Pyramid Game" would appear at the top of the game menu list until 10 players are shown it, whereupon it would not appear at the top until the next day.

Like the game selection bid method above, more sophisticated implementations could be based around this method. Firstly, bids may only be deducted from the budget for unique views—if a player is identifiable through the casino management system, a bid may only be deducted for the first time they are shown a game, or maybe only the first time they are shown a game in a day, a distinct session (i.e. only once per card per Player Terminal) or other time period. Furthermore, menu view bid deductions may be adjusted or ignored if performance of the player warrants it—so games that produce significant real or theoretical return to the casino may have the budget associated with the menu view bid adjusted less or not at all.

As with game selection bids, in scenarios where bids are automatically generated by the casino based upon game popularity (see popular game discussion below), strong player performance may cause the actual bid amount and/or bid budget to be increased.

As with time-based and game play event criteria, menu event criteria could be limited to certain times of days, certain players or certain Player Terminals. These qualifying criteria will be discussed in detail below.

Figure 6:
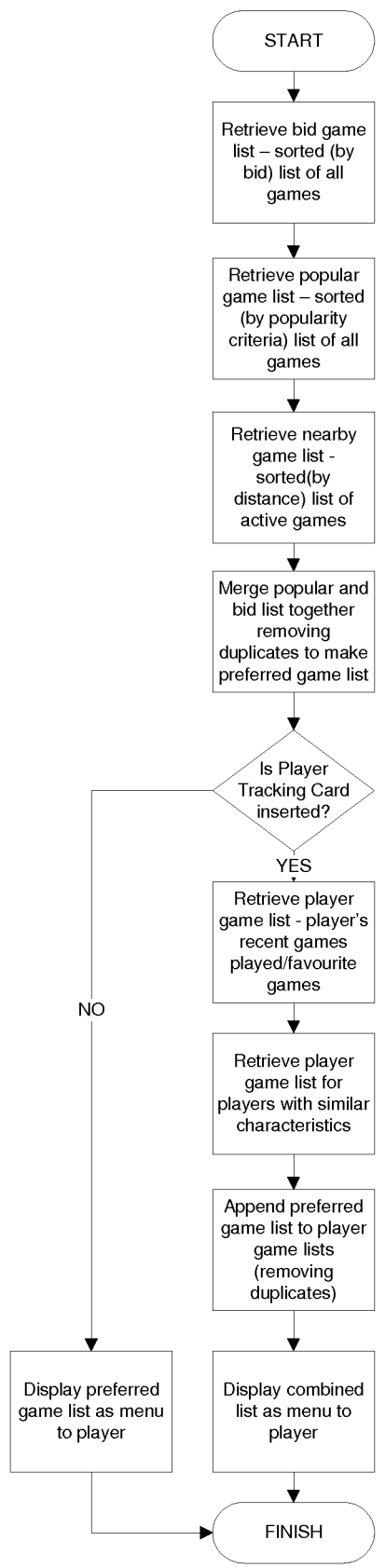
FIG. 6 is an exemplary Retrieve game lists for menu Process, according to an embodiment of the present invention.
Figure 7:
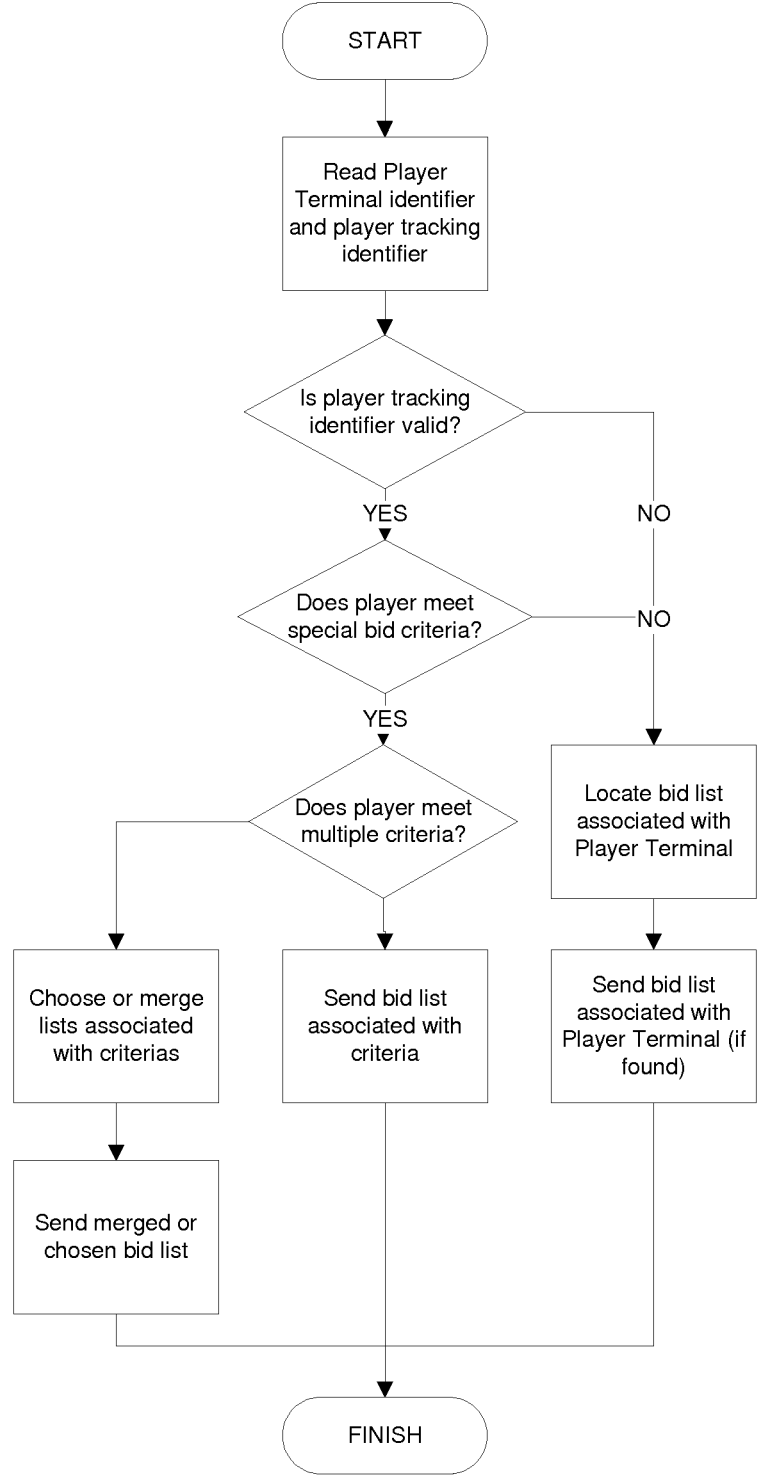
FIG. 7 is an exemplary Retrieve correct bid game list process, according to an embodiment of the present invention.

Continuing with the operation of the Game Optimisation Server, in particular the game menu list update process, as described by the software module indicated (5) in FIG. 2, please refer to FIG. 6 (along with FIG. 7, FIG. 8, and FIG. 9) in conjunction with the following description.

A game list update process may take place either
 (a) Every time a player presses the "game menu selection" button or equivalent at a Player Terminal.
 (b) Periodically—say, once per hour per Player Terminal
 (c) Every time a player tracking identifier card is inserted or removed.
 (d) Upon receiving updates to the data that drives the game list update process—for example, the existence of a new bid associated with a game.

In general, game menu lists are generated and updated on a per-Player Terminal basis. Although it is quite possible that more than one Player Terminal may receive identical menu lists, it is expected that the effort to generate a game menu list for each Player Terminal individually is not particularly onerous. If there is a need to reduce the amount of computation done overall in this process, it is possible to perform optimisations of the processes below by identifying points at which a "short-circuit" decision can be made.

The process of updating the game menu list for a particular Player Terminal follows the flowchart described in FIG. 6. Firstly, the Game List Update software retrieves the list of games generated by the bid list software, described above. This list may be empty if no bids have been placed by content providers or other interested parties.

The operation of this retrieval is described in more detail in FIG. 6. The software first identifies whether there is a player tracking identifier associated with the Player Terminal in question. This association would occur if a player were to insert a player tracking card into the Player Terminal, or by any other method that would cause the Player Terminal to be able to identify the player using it. For examples of such methods, please see the utility patent application made by the inventors of this application and filed on the same date as this application, titled "Anonymous Player Tracking" (U.S. patent application Ser. No. 12/265, 260, filed on same date herewith and which claims priority to U.S. Provisional Patent Application Ser. No. 60/985,982, filed Nov. 7, 2007).

It is also possible to implement this method without a player tracking identifier. During a session of play, data about the player builds up that allow criteria to be matched without reference to further historical data. In such a scenario, after an amount of qualifying play a temporary player tracking identifier may be assigned to the Player Terminal by the Game Optimisation Server, which would then be used for this and other processes related to game criteria. This temporary player tracking identifier would be deleted upon a trigger such as a player tracking card being inserted in the Player Terminal, or a period of idle time with no credits on the Player Terminal, which would imply that the player associated with the temporary player tracking identifier has left the Player Terminal.

If no player tracking identifier is present, the software searches its database for a bid list that includes the identifier for the Player Terminal in its list of associated Player Terminals. If such a bid list is found, it is retrieved.

If a valid player tracking identifier is present, however, the software then retrieves information about the player previously stored. This information is generated by game play events (see FIG. 5 discussion above), and allows the Game Optimisation Server to determine the suitability of the player for receiving a targeted bit list.

It is anticipated that certain players are more valuable than others. For example, a player with a high average bet may be a more important customer than one who bets small amounts. Or, players could be ranked based on their average spend per hour, or their total spend over a previous time period (such as a year). Therefore, it is anticipated that interested parties such as content providers may wish to bid either extra amounts to reach valuable players, or bid only for valuable players. It is also worth noting that there is a wide spectrum of valuable players, and a game may only be relevant to a small subset of these players. For example, some players play exclusively $1 denomination Player Terminals. It would be much better for all concerned if bids for inclusion on the game list menu for them were to be biased towards $1 games.

Bid lists, as previously noted, can contain criteria. Criteria already discussed include location based criteria, which limit the offering of a bid list to a subset of Player Terminals on the floor. In terms of players, criteria can encompass a number of other possibilities.

Figure 14:
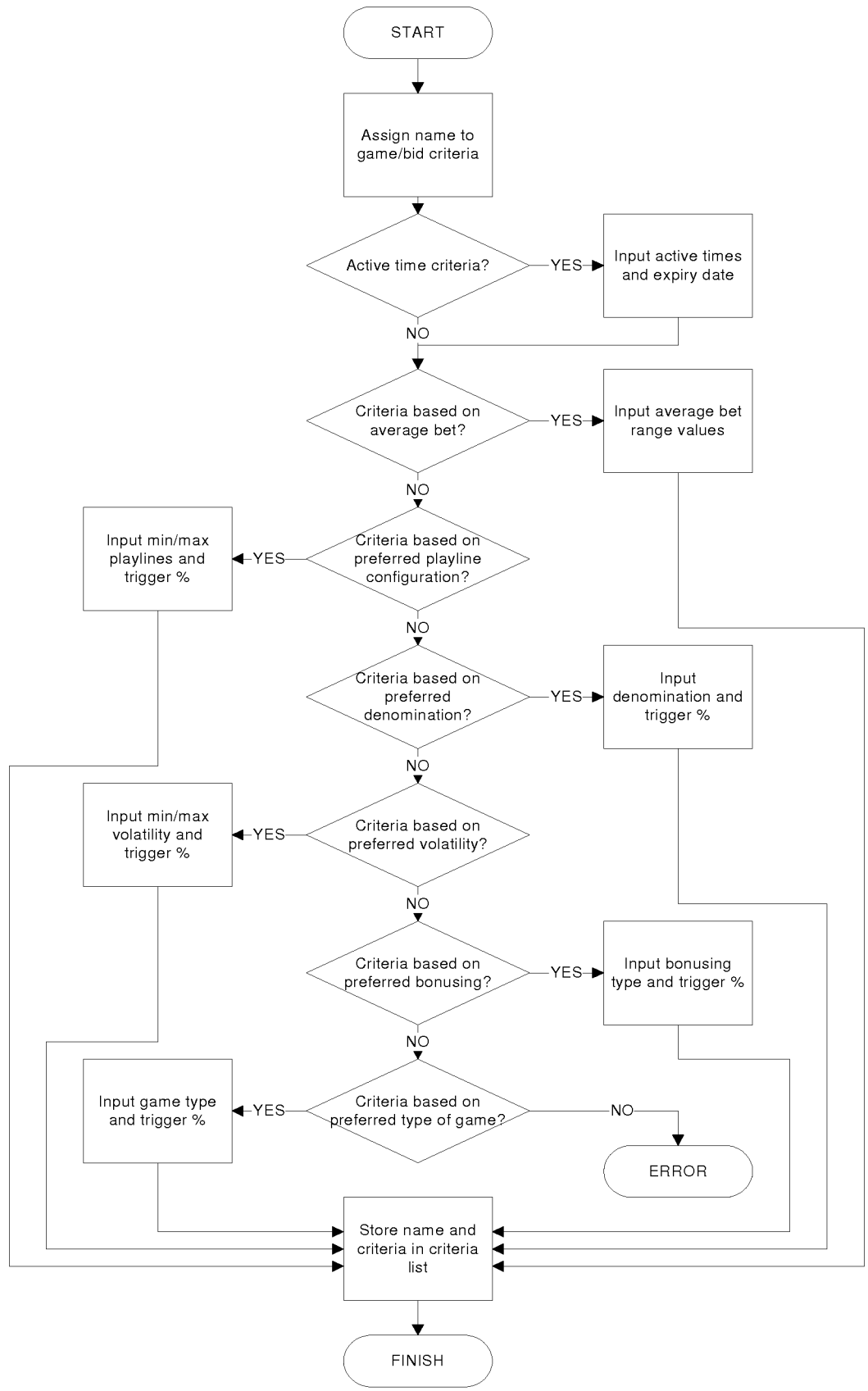
FIG. 14 is an exemplary Generate game or bid criteria process, according to an embodiment of the present invention.

A method of generating player criteria for a bid list is shown in FIG. 14. The operation is discussed below with respect to the User Terminal; the salient information for this purpose is that players may be eligible for receiving a targeted bid list if, amongst other things:
 1. The player has an average bet between a range of values
 2. The player tends to bet a certain playline configuration
 3. The player tends to play games with a certain denomination
 4. The player tends to play games within a range of volatility values
 5. The player tends to play games with a specific type of bonusing
 6. The player tends to play games of a specific type (e.g. video poker, or keno)

For all criteria where it must be ascertained that a player tends to meet that criteria, a trigger percentage value is used. So if we wish to find players that prefer to play 25 line games, we may set a trigger value of 50%, which will only select players that play at least 50% of their bets on 25 line games. Alternatively, instead of 50% of their bets, the criteria may use 50% of their game menu selections, or maybe 50% of their game menu selections that lead to a pre-defined amount of activity (e.g., the player must play 5 games or bet 100 credits for the activity to qualify as part of the sample).

Returning to FIG. 7, the software reads the criteria associated with all bid lists previously stored that are associated with the Player Terminal in question. For each list that the player meets the criteria for, the list is retrieved.

If the player does not meet any criteria, operation continues as if no player tracking identifier is present and a bid list is chosen based upon the Player Terminal, as described above.

If the player meets the criteria for exactly one bid list, this bid list is retrieved for inclusion in the game list menu. In an alternative implementation, this list is merged, or retrieved along with a non-player-criteria bid list chosen based upon the Player Terminal identifier.

If the player meets the criteria for more than one bid list, these bid lists may be merged or only one bid list may be chosen by ranking criteria. Merging would mean taking each entry of the multiple lists and adding them to a single list, which would be sorted by ranking. The preferred method of ranking would be the bid amount associated with each entry, although it is also possible that biasing could be used towards particular list(s) if it is anticipated that certain player criteria is more valuable to a casino than higher bids.

Once a suitable bid list is chosen or derived, it is retrieved and stored for later use.

Returning to FIG. 6, after retrieving a possible bid list, the Game List Update software generates a popular game list.

A popular game list is very similar to a bid list, and in fact can be constructed by a series of artificial bids. Popular games are games that meet some criteria that the casino operator wishes to maximise. For example, popular games may be defined as those which have the largest amount of money wagered on them over time.

Figure 8:
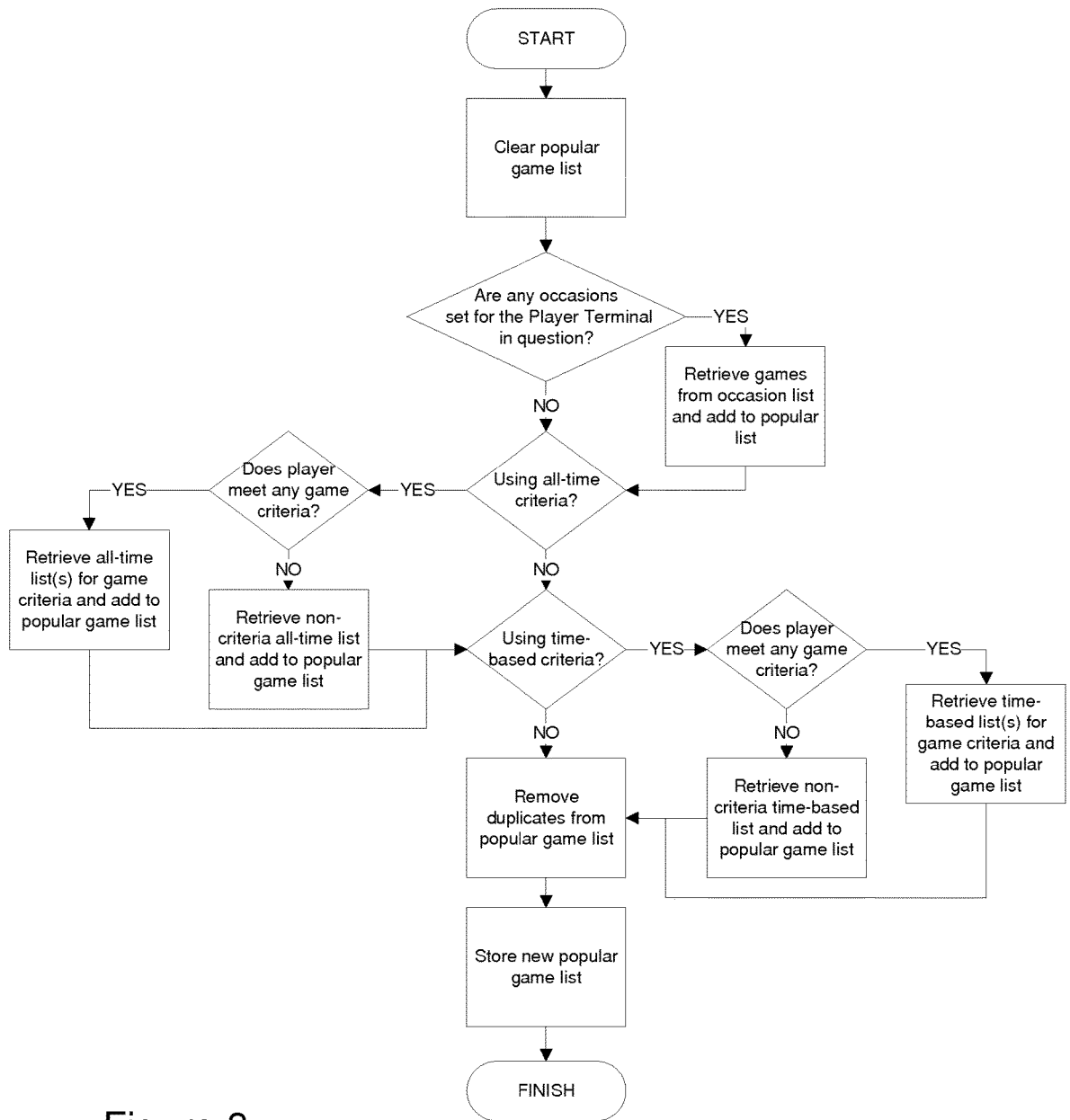
FIG. 8 is an exemplary Retrieve popular game list process, according to an embodiment of the present invention.

The operation of the generation of a popular game list is described in more detail in FIG. 8. As with a bid list, the Game List Update software first identifies whether there is a player tracking identifier (or temporary player tracking identifier) currently associated with the Player Terminal in question.

The Game List Update software then creates an empty popular game list. It then accesses a table of occasions to see if any are valid for this Player Terminal at present. An occasion is a means for the casino to override normal bid and popular game priority with games that are applicable for some occasion in the casino—say for example, New Years Eve or if there is a boxing match being fought that night. In such circumstances a casino can produce a list of games suitable for the occasion, with maybe higher minimum bets or higher denomination. Occasions may not be a rare occurrence—it may be desirable to set occasions for every Friday and Saturday night, for example.

Occasions, like any other criteria, may be restricted to a subset of Player Terminals. Each occasion would be defined with an associated list of Player Terminals.

If an occasion is valid for this Player Terminal, it is copied into the popular game list.

As well as the different types of criteria expanded upon during the generation process in FIG. 14, there can be different popular game lists based upon the time period being considered. As can be seen in FIG. 8, there could be all-time criteria or time-based criteria (or even a number of time-based criteria). In the case of all-time criteria, the Game List Update software is finding the most popular games of all time. In the case of time-based criteria, the Game List Update software is finding the most popular games of, say, the last week, or, say, the last four weekends.

If all-time criteria are being used, the software then makes a decision based upon the presence of a valid player tracking identifier. If no player tracking identifier is present, the software searches its database for a popular game list that includes the Player Terminal identifier in its list of associated Player Terminals. This popular game list would consist of a list of games, ranked by popularity. Popularity could be defined as those which have the largest amount of money wagered on them over time, or by some other ranking such as player survey results. If such a list is found, it is added to the popular game list created at the beginning of the process.

If a valid player tracking identifier is present, however, the software then retrieves information about the player previously stored. This is the same information retrieved for the bid list process above.

Also, as in the bid list process above, the Software tries to match the player information against criteria generated in the process described in FIG. 14. It should be noted that although method for generating the criteria for popular games lists and bid lists are the same, there is no reason why they should share the same values. In fact, because the use of the different types of criteria is different, the results obtained by matching a player to popular game list criteria versus matching to bid list criteria can be quite different.

An example will make the distinction clear.

If the most popular game on the floor for a $1 denomination player is "Seven Game", and a player with a history of playing mostly $1 games inserts their player tracking card into a Player Terminal and selects the game list menu, they will see "Seven Game" at the top of the "Most Popular" list. If, however, there is no bid in the bid list for "Seven Game" but there is a bid list entry of $5 per click per $1 player for "Diamond Game", the player will see "Diamond Game" at the top of the bid list. Depending upon the way the Player Terminal game list display is configured (see below), "Diamond Game" may appear above or below "Seven Game" or on a separate menu page altogether.

Once an all-time list is retrieved (if enabled), the Game List Update software retrieves any time-based lists that are active for this Player Terminal using the same method of determining if a player tracking identifier is present, and retrieving a criteria base list versus non-criteria list as necessary.

Once all popular game lists are retrieved, any duplicates within the list are removed, and the whole list, if not empty, is stored for later use.

At this point both the bid list and popular game list may be merged to make a preferred game list. In a preferred embodiment, the popular game list takes priority over the bid list, and all entries in the popular game list are copied into the preferred game list first. Then, each entry in the bid list is added, provided the associated game in each entry does not already exist in the preferred list, in which case the entry from the bid list is discarded as a duplicate. In this embodiment removing the bid entry may cause the bid budget associated with that particular game to not be adjusted upon a player selecting or playing the game. This is desirable behaviour as it removes the need for popular games to have large (or indeed, any) bid budgets.

Alternatively, the bid list takes priority over the popular game list. Such an implementation may increase casino revenue from bids. In another alternative implementation, the lists are not merged and are presented to the player as separate lists.

Returning to FIG. 6, after merging the previous lists into a preferred game list, the Game List Update software possibly generates a player game list.

Generation of a player game list generally requires the presence of a player tracking identifier (either real or temporary) at the associated Player Terminal.

Figure 9:
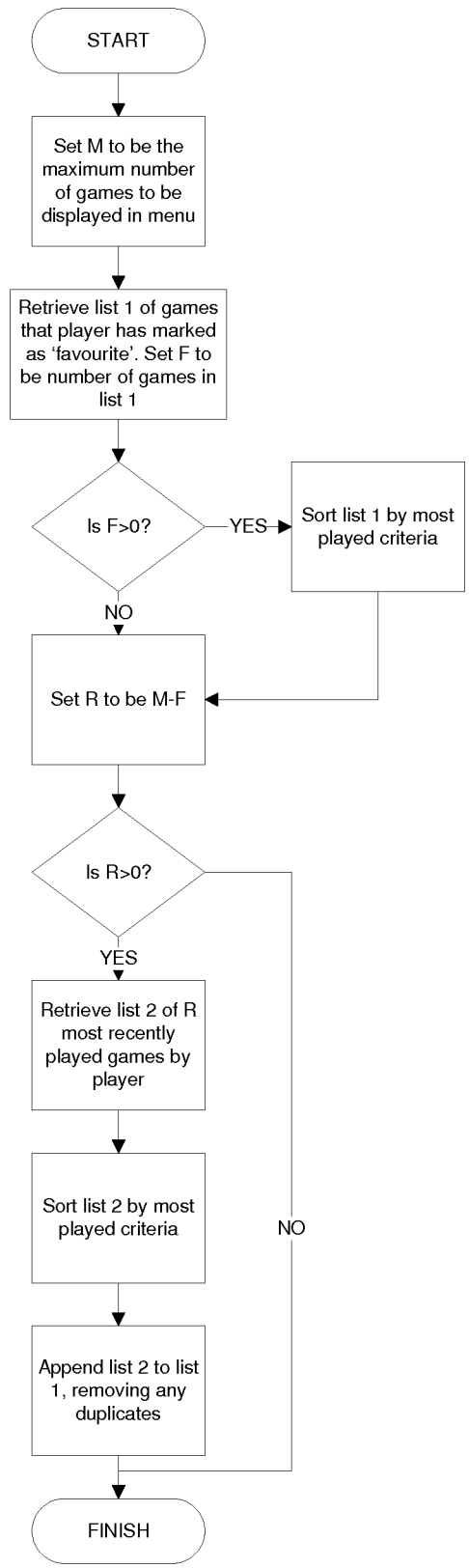
FIG. 9 is a an exemplary Retrieve favorite game list process, according to an embodiment of the present invention.

The operation of one possible implementation of the generation of a player game list is described in more detail in FIG. 9.

A player game list is a list of games that are relevant to a particular player because of (a) positive selection—the player has chosen to mark these games as "Favourites" and (b) automatic selection—the Game List Update software has chosen the games based on either the player having experience with the game, or because it is expected that the player would enjoy playing the game.

In the example implementation in FIG. 9, there is a constraint, M, concerning the maximum number of games that may be displayed within a menu. This constraint need not be a small number, nor may it reflect 1 page of menu display—for example, if the game list menu display software can only display 5 games per page, a value for M of 25 would allow 5 pages of favourites to be displayed. If M was 1000, 200 pages of favourites could be displayed.

To generate a favourite game list, first M is retrieved. Then the list of games that a player has previously marked as being 'favourites' is retrieved. A player may have marked a game as being a favourite in a number of ways. A preferred method shown as implemented with FIG. 3, is for a player to hold her finger down on the touchscreen over the icon representing the game on the game list display menu for more than a period of time, say, 1 second. This causes a letter 'F' to be denoted next to the game. In the example shown in FIG. 3, the "Pyramid Game" has been previously marked by this method. Removing a game from the favourites list could be achieved by repeating the action of holding a finger down on the touchscreen on the game icon.

Once the player favourite list has been retrieved, the value F is set to be the number of entries in this list. If F>0 (i.e. the list is not empty), the list is sorted by some criteria.

The criteria used to sort the player favourite lists could take more than one form. Ranking could be to set by:
1. The length of time that the player has played this game across multiple sessions
2. The time of last play—most recent games played being ranked highest
3. The amount (net or gross) that a player has won playing a game
4. The number of successful sessions (i.e. gaming sessions where a player has come out ahead against the casino) associated with a game.
5. The average bet that the player has wagered on a game.
6. The RTP of a game (higher RTP games may be ranked higher, or possibly lower)
7. Bonus promotions associated with a game—games with a promotion attached to them may be ranked higher.

It is clear that this is not an exhaustive list, and that it is also possible to combine the above ranking criteria to further rank similar games.

Once the player favourite list, if present, is sorted, the value R is set to M-F, which is the space in the menu left for 'automatic' favourites, not chosen by the player to be included.

Automatic favourites allow a player to be presented with games that they have played before, without having to designate them as favourites.

The Game List Update software retrieves a list of automatic favourites by examining the player history. It selects games from history by the criteria listed above for the generation of the player favourite list. Taking the example of last play time as the criteria, if the value R is set to 90, then the Game List Update software would retrieve the last 90 games that the player has played. If the criteria were gross amount won, the Game List Update software would retrieve the 90 games that the player has played with the largest gross amounts won.

Once retrieved, the automatic favourites list is sorted, again using one or some of the criteria list above for the generation of the player favourite list. It's important to note that the criteria used for sorting the automatic favourites list may not be the same as that used to choose games from the history. For example, using the last play time to retrieve the last 90 games that the player has played could be combined with sort criteria to rank these 90 games based upon the length of time that the player has played the game across multiple sessions, or based upon the number of successful sessions associated with a game.

After both automatic and player favourite game lists are retrieved, the two lists are merged. It is preferred that the merge function places the player favourite games above the automatic favourite games, whilst removing duplicate game entries. Removal of duplicates is also possible during the retrieval of the automatic favourites list—as each entry is retrieved from the player history it is first checked to see if it is already present in the player favourite list. If so, it is discarded.

Returning to FIG. 6, the Game List Update Software then possibly retrieves further player favourite game lists for similar players to the current player. This operation entails using the player tracking identifier, or temporary player tracking identifier, currently associated with the Player Terminal to retrieve criteria concerning the player that can be matched against other players, or a set of other players. For example, if the criterion is average bet, the average bet of the current player tracking identifier is retrieved, and the software then looks-up player tracking identifier(s) with similar average bets. Once these player(s) are found, the process of retrieving a favourite games list for these player tracking identifiers (FIG. 9) is further performed.

The advantage of retrieving favourite games lists for similar players is it enables players with little play history (or even only a temporary player tracking identifier) to be presented with a list of potential games that may be of interest to them based on similar player profiles.

Ones all lists (bid, popular and favourite(s)) have been retrieved or generated, the Game List Update Software prepares the lists for display by the Player Terminal.

The Game List Update Software optionally at this point traverses each list to check if any games in the lists are eligible for promotions. The generation of promotions is described below with reference to FIG. 15, once generated each promotion is associated with a game and possibly a set of Player Terminals. If any game does have a promotion associated with it, and if the Player Terminal in question is also eligible, the promotion data is checked to see if it requires eligibility of the player. If it does, because some criteria must be met by the player, then the player history data associated with the (temporary or actual) Player Tracking Identifier is used to ascertain if the player meets the eligibility for the promotion. For example, if the promotion requires an average bet of more than $100 per hour, the player history must have an average bet of more than $100 per hour for the promotion to be active.

For each promotion found that is found to be eligible (both for the player and Player Terminal) a graphical or text element such as that marked as (6) or (7) in FIG. 3 is added to the game entry for later display.

In a preferred embodiment, the lists are kept separate and sent to the Player Terminal for display. Separate lists are displayed on separate menu pages. An example is shown in FIG. 3. In this example, there are five separate menu pages presented to the player—"Bid", "Nearby" (8), "Favourites" (9), "All-Time" (10) and "Last Week" (11).

The Bid menu consists of games in the bid list generated by the Game List Update Software. In the example shown in FIG. 3, the Bid menu is the active menu and the three games on display ("Pyramid Game", "Seven Game" and "Star Game") (1) are games from the bid list. There are more than 3 games in the bid list, and thus the list is split across 5 pages (4).

If the player were to press "Favourites" (9), a menu constructed from the favourite game list would be displayed, and similarly pressing "All-Time" would display a menu constructed from a popular game list based on all-time popularity, and pressing "Last Week" would display a menu constructed from a popular game list with a time criteria of 7 days.

In an alternative implementation, as described in FIG. 6, one or more of the lists may be merged into one list displayed on the menu. In this case there would be no separate menu pages for "Bid", "Nearby", "Favourites" "All-Time" or "Last Week" in FIG. 3.

In either case, the graphical menu may be constructed from the list elements by software installed on either the Game Optimisation Server or the Player Terminal. In addition, once the menu has been constructed it is possible to ensure that the Player Terminal has ready access to the games that are most likely to be played (because they are at the top of a list). In the case where the Player Terminal has limited storage for game software, the generation of the menu could be implemented to result in the Player Terminal retrieving the most likely games to be played from storage (either local or network-based), to ensure quick access when a player selects them.

Once constructed, the graphical menu is ready to be displayed to the player by the Player Terminal. In the preferred embodiment, the menu is displayed upon the player pressing a "Game Menu" physical button or a touchscreen virtual button. Using the example game list menu in FIG. 3, if the player were to press the "Exit" (12) touchscreen button they would be returned to the previous game they were playing. Furthermore, after selecting a game from the menu, by pressing the icon (2) or the game name (4), the specified game would be retrieved from storage (if necessary) and play could begin. A preferred feature of this method is that once a set of menus have been generated, if the contents of the menus have not changed between times when a player accesses them via the game menu, the player should be returned to the exact same menu page they were at previously. So, in the example in FIG. 3, if a player presses the "Next" (5) button to go to page 2 of the Bid games, and then selects a game, if they press the game menu button again they should be first presented with page 2 of the Bid games, rather than page 1. This would allow players to easily navigate through a large number of games.

As noted in FIG. 3 and FIG. 6, in the preferred embodiment there is a "Nearby" process that leads to a "Nearby" (8) menu page being displayed on the Game List Menu.

The "Nearby" menu displays games that are near to the player. Preferably, there would be some indications of which of these games are in use. The purpose of this menu is to anticipate the situation where a player, whilst walking through a casino, may see a game that she may wish to play that is currently being played by another player. By going to an idle terminal near to this played machine, the player can bring up the "Nearby" menu and quickly find the same game. In this context, the terminal can be a player tracking module on or associated a player terminal, a player terminal, a kiosk, or any device connected to the network.

In one aspect of the present invention, a method for use with a gaming system operating in a casino environment is provided. The gaming system including a plurality of player terminals 1 networked to a game optimisation server 10. The game optimisation server provides or allow a player to access multiple games on each player terminal and stores in memory a record of the games played on each player terminal 1. The method includes the steps of allowing a player to access a first terminal and to request a map of the casino environment. The first terminal may be a first player terminal 1 or other device connected to the network. The method includes the steps sending the request to the game optimisation server 10, receiving the request at the game optimisation server 10 and responsively sending data related to a physical arrangement of the player terminals, and to the games recently played on the player terminals 1 in a local area, to the first terminal. The method also includes the step of receiving the data at the first terminal and displaying to the player a map showing the physical arrangement of the player terminals 1 and a game played on each of the player terminals 1. The map may include an indication of which player terminals 1 are currently being played and which are not being played.

In one embodiment the map is arranged on the first terminal 1 in a manner that represents the physical arrangement of physical terminals 1 in the casino in relation to the first terminal on which the map is being displayed. The map data may be updated periodically or in real time. The method includes the step of updating the map with updated date.

In another aspect of the present invention the method also includes the steps of allowing the player to select a second player terminal from the map and changing a current game on the first player terminal to the game being played on the second player terminal.

The indication of players playing on the other player terminals may include a name of the player and/or a representation or unique representation of the player and/or a graphical representation of the player. The map may also include an indication of any player linked to the particular player or another player.

In a further aspect of the present invention, the method includes the step of allowing the player to add information to the player terminals on the map. For example, the player may be allowed to tag player terminals on the map with one or more predefined tags, such as a favorites tag.

In another aspect of the present invention, the gaming system may include a progressive system including a sub-set of the player terminals linked together in a progressive game. The progressive system may include at least one progressive display for displaying the current amount of a progressive award. The method may include the step of displaying on the map a location of the progressive display relative to the player terminals and may also include the step of providing an indication of the player terminals linked together in the progressive game.

The map may also include information related to the current game being played and a previous game played such as the name of the game. Additional information may also be presented such as whether or player is cold or hot. A relative "hotness" of the player may defined in terms of how much a player has won which may be relative to how much wagered, or the rate at which a player has played or wagered. The map may further indicate a hottest player and/or a coldest player.

Figure 16:
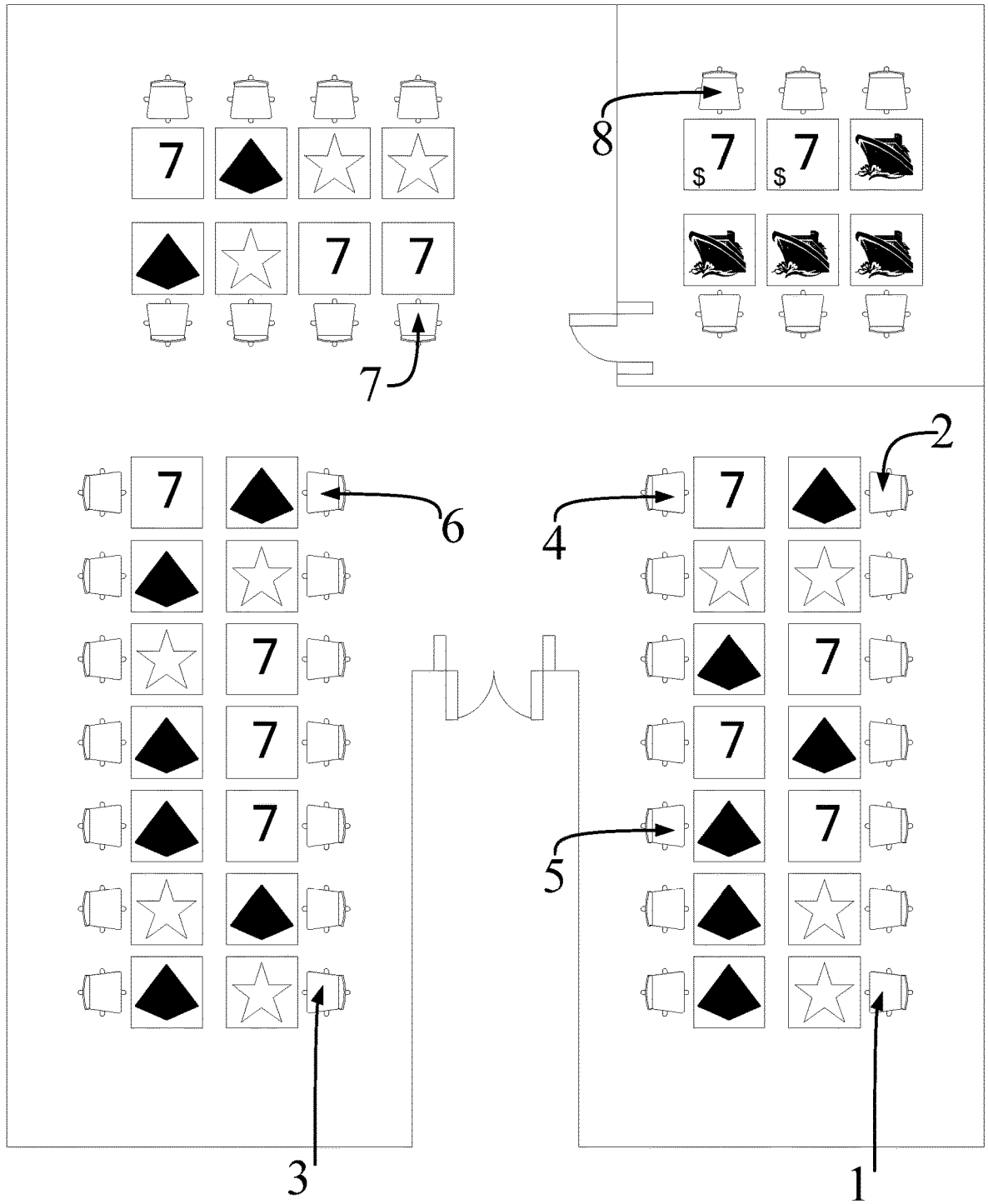
FIG. 16 is an exemplary physical arrangement of an installation, according to an embodiment of the present invention.

In one embodiment, the process to generate this list would be for the Game List Update software to use the physical arrangement data stored on the Game Optimisation Server to rank all, or some of, the Player Terminals by distance from the Player Terminal in question. An example layout of an installation of Player Terminals is shown in FIG. 16. The physical arrangement data stored on the Game Optimisation Server could consist of (x, y) co-ordinate pairs for each slot machine, along with areas designated as "walls". Software stored on the Game Optimisation Server or on another system could interpret this data to produce lists of which Player Terminals that are near to a particular Player Terminal. This software would take into account the presence of walls, or the fact that a player cannot see the Player Terminals on the other side of a double bank of Player Terminals when building the lists. Some examples using FIG. 16 will make this clear.

A player sat at the seat indicated by (1) would only be possibly able to see the Player Terminals to his right, i.e. all of the Player Terminals between (1) and (2). He cannot see Player Terminals (4) or (5) because they are obstructed by the Player Terminals between him and them in the double bank.

A player sat at the seat indicated by (3) may be able to see the Player Terminals between (3) and (6) and possibly the Player Terminal at (7).

A player sat at the seat indicated by (4) may be able to see the Player Terminals between (4) and (5) and the Player Terminals at (6) and (7).

This list could be further filtered by removing idle Player Terminals (i.e. terminals that do not have any credits or play currently occurring) or by biasing the list towards Player Terminals that have player tracking identifiers associated them that match in some criteria the player tracking identifier associated with the Player Terminal in question.

Figure 10:
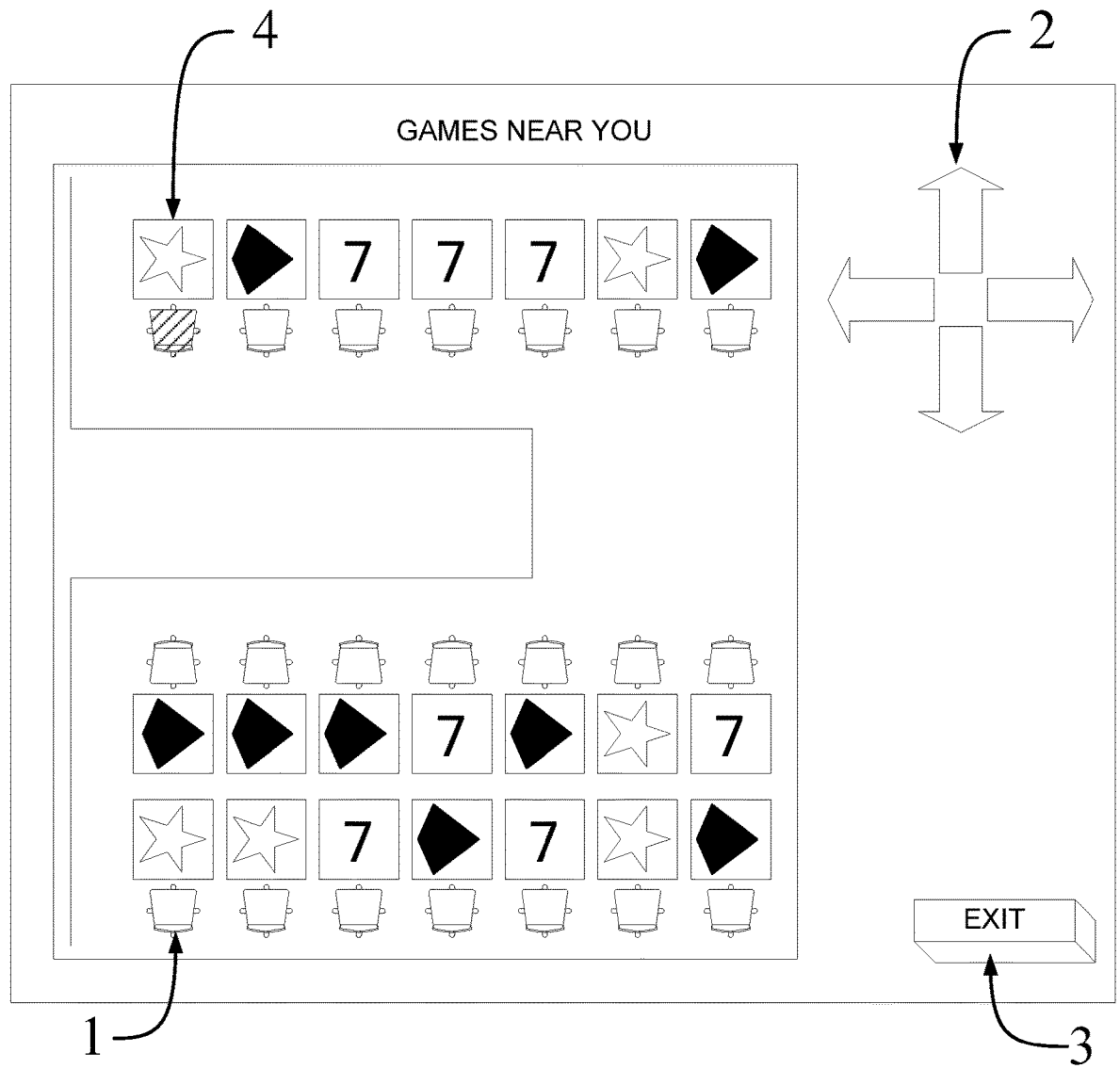
FIG. 10 is an example display of nearby games menu, according to an embodiment of the present invention.

A preferred method of displaying the "Nearby" menu is shown by way of example in FIG. 10. This example assumes the same physical arrangement of Player Terminals as in FIG. 16. If a player is seated at the physical terminal marked (1) in FIG. 16, upon pressing the "Nearby" button, they would see a nearby menu showing a graphical representation of the casino floor based around their position and orientation. This representation is shown in FIG. 10, with the player's Player Terminal (1) shaded for the player's benefit to clarify the player's location. Alternative means of clarifying position could include a pop-up bubble text with the words "You are here", flashing near the indicated Player Terminal.

As can be seen with reference to FIG. 10 and FIG. 16, the arrangement of the casino floor has been rotated with respect to the indicated Player Terminal. This is an optional feature of this invention, but is used to help assist the player in locating other Player Terminals with respect to their Player Terminal. If the player was using the Player Terminal indicated with (7) in FIG. 16, no rotation would have been necessary.

It is anticipated that in many implementations of this invention that it would be impractical to display every Player Terminal in the installation on one "Nearby" menu page. For this reason, navigation arrows (2) are provided which allow a player to scroll around the casino floor to see other games.

As can be seen in FIG. 10, each representation of a Player Terminal contains a graphical image representing the game currently or last played at that Player Terminal. If a player presses the area of the screen occupied by the graphical image, then preferably further information about the game (such as the game name, denominations and other information as indicated as (3) in FIG. 3) is displayed along with a prompt asking if the player wishes to play it. This prompt may not appear if it is not possible for the player to play the same game at this Player Terminal, for example if the game in question requires special physical hardware (such as physical stepper reels) that is not present on this Terminal.

Alternatively, pressing the area of the screen occupied by the graphical image would immediately cause the game in question to be presented to the player (after loading from storage or over the network, if necessary).

A further enhancement of the "Nearby" screen is indicated as (4). The chair associated with the Player Terminal at (4) is shaded. This, or another display method, is used to indicate to the current player that the person playing the Player Terminal at (4) is linked to them. This linkage would be established by the Casino Management system, or by the Game Optimisation Server User Terminal. Such a link would be used for players affiliated with one another—say, a husband and wife—to be able to find one another in a casino by simply inserting their player tracking card into any Player Terminal then bringing up the "Nearby Menu" to show the other player on the "Nearby" map display. There could also optionally be buttons or touchscreen virtual buttons marked "Find other players" which would present a list of affiliated players to a player and allow them to select from the list. Selecting from the list would preferably show an animation indicating how to find the selected player from the current location.

It is also preferred that the display of active games in the "Nearby" map may change in real-time as the Player Terminal receives information from the Game Optimisation Server concerning active game changes, or affiliated player tracking identifier insertions or removals.

It should be noted that any or all of the games generated by the Game List Update Software, or displayed by the menu software at the Player Terminal may be filtered by some rule such as "only display games from Content Provider X". Such rules could be used to ensure that banks of machines are restricted to a particular content provider, or particular denominations (e.g. in the High Roller room).

A further aspect of this invention is that it provides for the enhanced management of the demonstration or idle aspects of Player Terminals.

Historically, Player Terminals have generally only been capable of playing one game. Player Terminals capable of playing more than one game have existed, but in these the game software present has always been designed such that switching between games has been an event that is generally only done upon player selection or upon basic schedules from a command sent by the casino management system.

It has also been a feature of Player Terminals that they include a demonstration or idle mode of the game software, which is usually activated upon a period of idle time occurring. This idle time is generally defined as being when a Player Terminal has no active credits, no game currently being played, no player tracking card inserted, no user operation (such as help screen navigation) current and a suitable period of time (say, 5 minutes) has occurred since any of these conditions were not met.

This invention describes methods for the use of idle mode for better operation of the Player Terminals and as a means of optimising the installation of a gaming floor to provide better, more suitable games for players to be enticed by.

The first improvement on existing methods of dealing with idle mode is that it is a feature of this invention that the Game Optimisation Server has a software module (denoted (15) in FIG. 2) that is able to update the game currently active on a Player Terminal. This Active Game Update Software is also capable of instructing a Player Terminal to display idle or demonstration material not related to the current active game on the Player Terminal in question. For example, the Game Optimisation Server could request that a Player Terminal play back a pre-recorded animation that advertises another game. This animation may include a touchscreen related display element (i.e. a virtual button) that would cause the advertised game to become the current active game on the Player Terminal in question. Furthermore, the Active Game Update Software may request that the Player Terminal should pre-load the advertised game, if necessary, to ensure that if the advertised game is requested by a player it is ready to be played. Alternatives to a virtual button embedded in an animation could be achieved by the Active Game Update Software amending, or causing the Game List Update Software to amend, one of the game menu lists (e.g. the Player Favourite Game List) such that the advertised game is easy to find by a player if they so wish.

As well as displaying an animation of a suitable game, the Active Game Update Software may send a command to the Player Terminal to update the current active game. This command is received by the Game Control Software (denoted (7) in FIG. 2), and causes the Player Terminal to retrieve, if necessary, a new game from local or network storage and make it the current active game for that Player Terminal.

Figure 11:
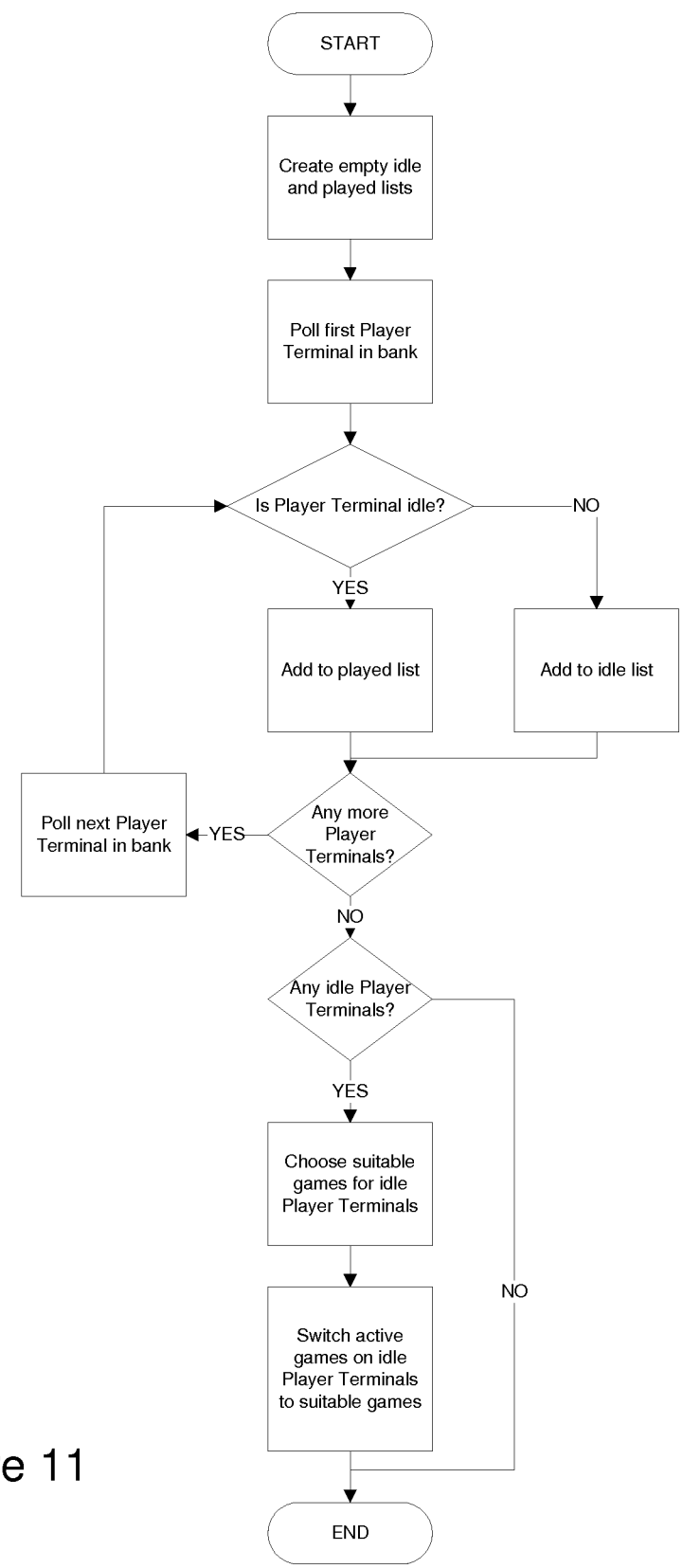
FIG. 11 is an exemplary Update idle Player Terminals process, according to an embodiment of the present invention.

A method for deciding which games should be made active on which Player Terminals is now described, with reference to FIG. 11.

Figure 15:
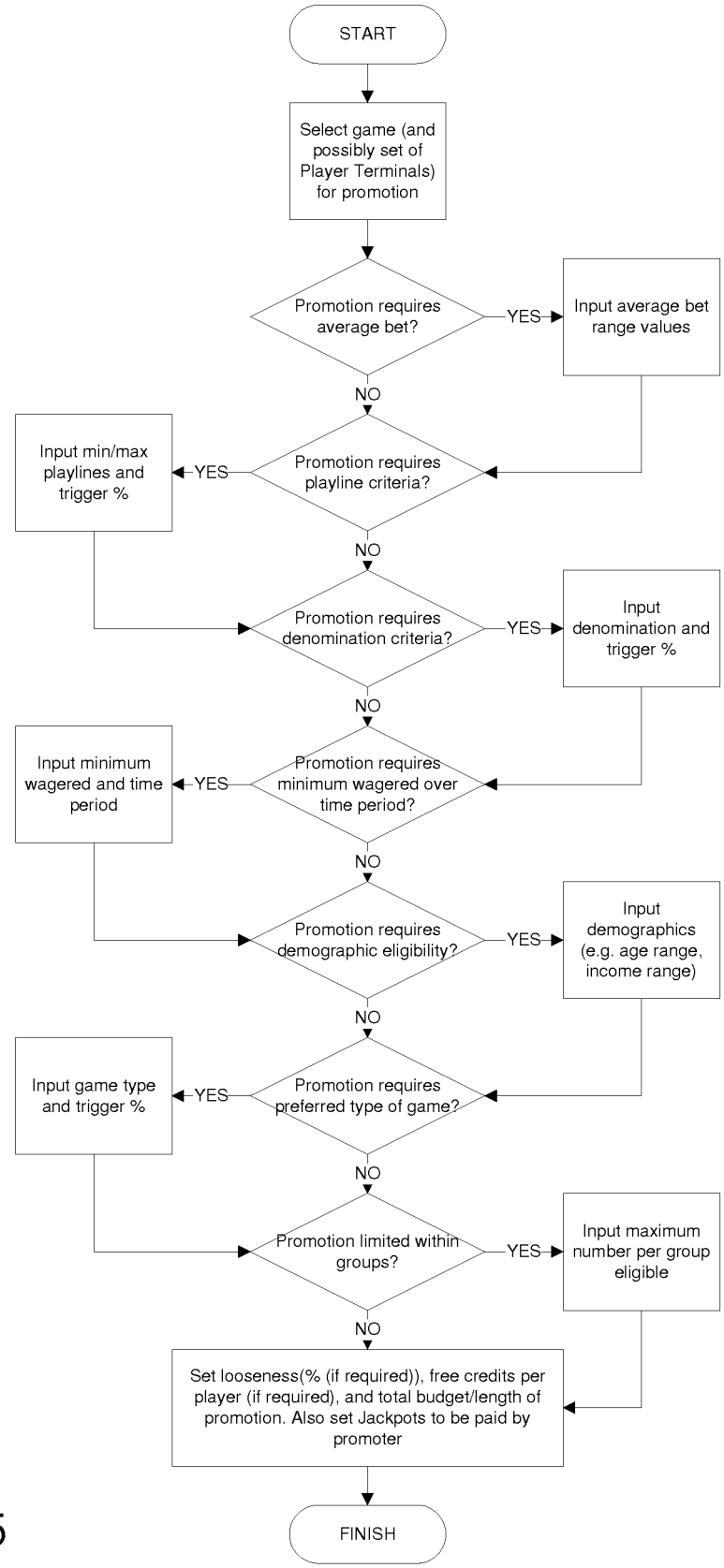
FIG. 15 is an exemplary Generate promotion process, according to an embodiment of the present invention.

This process works on a per-bank basis. A bank of Player Terminals is a set of Player Terminals that are usually co-located. In FIG. 15, a bank may be defined as being all Player Terminals between the terminal marked (1) and the terminal marked (2). Banks need not be all facing in the same direction. In FIG. 16, the terminal marked (8) may be part of a bank of 6 Player Terminals, all located within one room in two rows of three. It is also possible to implement this method across the whole installation, where every terminal is included in one 'bank'.

The first operation of this process is that two empty lists are created—idle and played.

Then, each Player Terminal in the bank is polled, or analysed, in turn to determine idle status. This polling may consist of the Game Optimisation Server communicating with the Player Terminal, or it could be by some other means such as the Active Game Update Software retrieving a previously communicated event from the Player Terminal indicating idle status. Yet another method could be that the Game Optimisation Server, by storing all events received from the Player Terminal, has enough data that analysis of this data by the Active Game Update Software is possible to ascertain idle status.

If a Player Terminal is idle, it is added to the idle list, and if it is not, it is added to the played list. Polling then continues until all Player Terminals in the bank have been added to either the played or idle list.

If no Player Terminals in the bank are idle, the process terminates as it is not desired to modify games that are currently in use.

If any Player Terminals are idle, then suitable games (or other material) are chosen for these Player Terminals. Methods for the implementation of this choice are described in FIG. 12 and FIG. 13.

Figure 12:
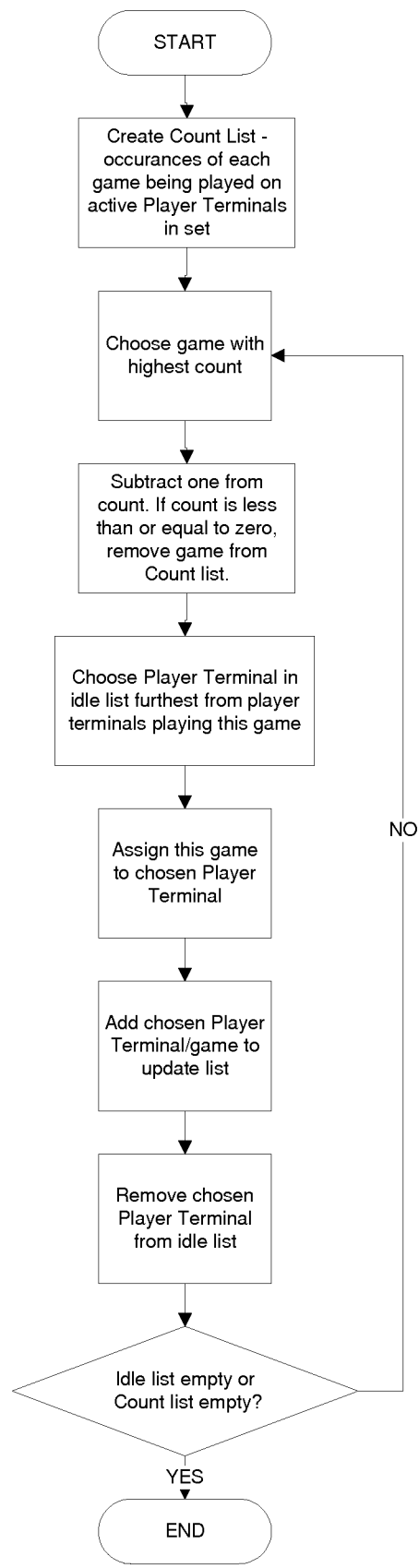
FIG. 12 is an exemplary Choose suitable games for idle Player Terminals based on local popularity process, according to an embodiment of the present invention.

Taking the method shown in FIG. 12 first, each game in the played list is first assigned a count, this count being the number of occurrences of that game in the played list. So, for example, if there were 6 Player Terminals in the played list and they consisted of
1. Star Game
2. Pyramid Game
3. Pyramid Game
4. Seven Game
5. Star Game
6. Star Game Then the count list would be:
Star Game—3
Pyramid Game—2
Seven Game—1

Next, the game with the highest count is chosen—in the example above this would be "Star Game". In the event of a tie, other factors could be used to preferentially choose a game—possibly:
 (a) The total number of idle Player Terminals already displaying each tied game on the bank or across the whole installation—a lower number would be preferred.
 (b) The total number of active Player Terminals already displaying each tied game on the bank or across the whole installation—a higher number would be preferred.
 (c) The historical activity data of each game—games with consistently higher return to the casino (or even return to the player), or higher average bets may be preferred.

Once a game is chosen from the count list, its count is decremented by one. In an alternative implementation, its count may be decremented by more than one (say, 1.1) to produce different distributions of games on a bank.

If decrementing the count results in the count associated with a game being zero or below, the game is removed from the count list.

After choosing a game to be placed on an idle Player Terminal, the next operation is to choose a Player Terminal to receive the game. In the embodiment described in FIG. 12, the Player Terminal chosen is the terminal which is located the furthest away from all active terminals playing the game in question. Alternatively, the Player Terminal chosen could be:
 (a) A terminal adjacent to a terminal playing the game in question.
 (b) A player terminal located furthest from all active terminals, regardless of game.
 (c) A terminal chosen because it is adjacent to another, possibly different, game which is also adjacent to a terminal playing the game in question.
 (d) A terminal which is furthest from a wall or corner, or even nearest to a wall or corner.
 (e) A terminal that has been idle for the least amount of time, or even the most amount of time.

This list is not-exhaustive, and other criteria could be employed in this decision.

Once a suitable idle Player Terminal has been chosen, it is added to an update list along with its newly-assigned chosen game. The chosen Player Terminal is then removed from the idle list under consideration.

Once the idle list is empty, or the Count list is empty, the process detailed in FIG. 12 is complete.

The update list, as generated in FIG. 12, is then used by the Active Game Update Software. Preferably, it used to change the active games on the Player Terminals in the list to their newly-assigned game. Alternatively, it is used to cause the Player Terminals in the list to display an animation or other promotional material to demonstrate or advertise the newly-assigned game. This promotional material may or may not also cause the active game on the Player Terminal in question to be updated.

It is also possible that the Active Game Update software may cause a Player Terminal to display promotional material not related to a game, such as animations concerning the Casino or related entities—for example an animation indicating that "Tuesday is Half Price Steak Night".

Figure 13:
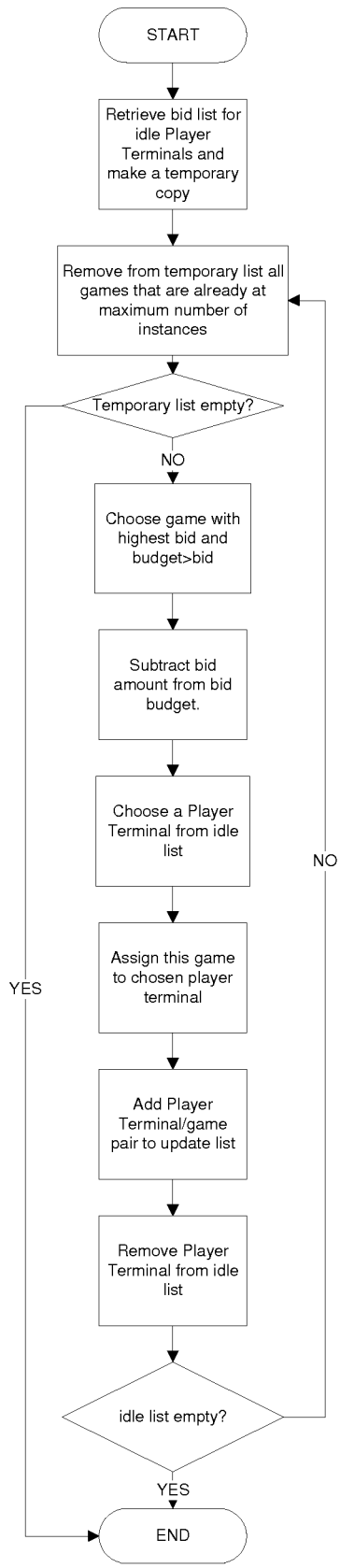
FIG. 13 is an exemplary Choose suitable games for idle Player Terminals based on bid, according to an embodiment of the present invention.

Another method for the choosing of games or other material for idle Player Terminals is described in FIG. 13. This uses the concept of the bid list, described in much detail above.

Bid lists can be used by interested parties, such as content providers, to change the active game on idle Player Terminals to games of their choosing. As with the Game Menu Display, it is also possible to use Bid lists to automatically favour games that the Casino operator would prefer were being played—games with higher amounts of return to the Casino, or higher average bet. The method of generation of a bid list for idle Player Terminals is the same as that for the previously described methods of generation of a bid list for Game Menu Displays. For example, each entry in a bid list may indicate a bid amount that will be payable by the interested party each time an idle Player Terminal has its active game switched to a game associated with the bid entry.

Bid lists for idle Player Terminals, like other bid lists, may also be restricted to a subset of banks of Player Terminals, or to an arbitrary set of Player Terminals. It is also possible to set up a bid list for only one particular content provider for a bank of Player Terminals. This would ensure that all idle Player Terminals on that bank would only show games from that content provider, and would allow the content provider to further 'brand' that bank.

Following the process described in FIG. 13, a suitable bid list is retrieved for the set (or bank) of Player Terminals in question. This may be a bid list with or without criteria. A temporary copy of this list is made so that actions can be performed on the list without making a permanent change.

First, all games in the bid list that are already present to some degree in the bank in question are removed. This decision may encompass active, idle or all Player Terminals. The threshold that determines which bids are removed is a parameter that could be set by such example criteria as:
 (a) Only allow at most 3 games activated by bid per bank.
 (b) Only allow a game to be on at most 50% of a bank.
 (c) Always allow one more instance of a game if all others are active.
 These threshold criteria could ensure that unwanted games do not swamp wanted games in a particular area.

If this removal of bids causes the temporary copy of bid list to be empty, then the process is finished. Otherwise, the bid entry with the highest bid amount is chosen, providing it has a current bid budget large enough to support the bid amount being deducted.

The bid amount is then deducted from the bid budget, and a suitable player terminal is chosen to receive the game associated with the bid entry. Methods for choosing this player terminal are the same as described above with reference to FIG. 12.

As before, the game and Player Terminal combination are added to an update list, and the Player Terminal is removed from the idle list.

If the idle list is not now empty, the process continues by repeating for the rest of the idle list from the point where bid entries are removed based upon presence in the bank—this ensures that the new amount of instances associated with the highest bid is taken into account.

Once all idle games are added to the update list, this process is finished, and the Active Game Update Software can use the update list as before.

It should be noted that both methods described in FIG. 12 and FIG. 13 could be performed together on an idle list to produce a combined update list. This update list would encompass a mix of games that are being played at other Player Terminals and also games that have been bid upon. The order of executing the methods in FIG. 12 and FIG. 13 would be decided upon based on what is preferred—maximising revenue from bids would be achieved by executing the method described in FIG. 13 first, whilst executing the method described in FIG. 12 first would lead to more popular games being placed on idle Player Terminals.

Another method that could be used by the Active Game Update Software to update idle Player Terminals would be to use the Popular Game List generation method detailed above, where instead of adding the popular games to a Game Menu Display, the games are added to the update list for idle Player Terminals.

It is also apparent that criteria (as generated in FIG. 14) could be applied as part of the selection process. For example, it could be defined at the user terminal that an area of a casino is a "High Roller" area where the minimum denomination is $10. All games that are placed on terminals in this area must meet this criteria.

Turning now to the operation of the User Terminal software (marked (21) in FIG. 2), the User Terminal software is the means that enables an operator to create and edit bid lists, bid criteria, bank definitions and other data used in this invention.

Figure 17:
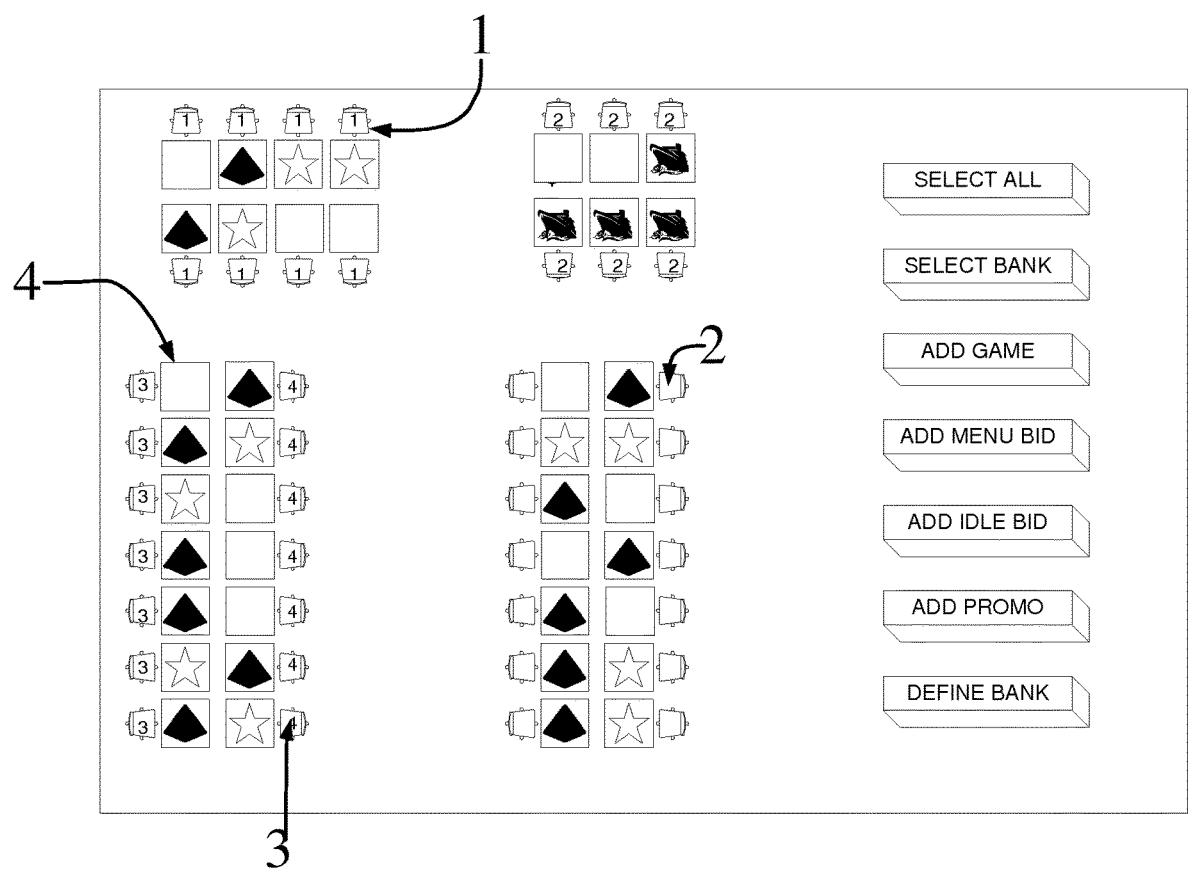
FIG. 17 is an exemplary Example User Terminal Display, according to an embodiment of the present invention.

FIG. 17 shows an example display presented to the operator of a User Terminal. As can be seen, it includes a representation of the layout of the installation (as also seen in FIG. 16) along with a number of command buttons.

The representation of the layout of the installation optionally includes information to assist the operator. In the example shown, icons overlaying the representations of Player Terminals (such as a "Pyramid" icon for the "Pyramid Game") are used to denote the game currently being played at that terminal, whilst those that are idle have no icon (4) on the representation of the Player Terminal.

Also in the example shown, are representations of which Player Terminals are associated with which bank. The bank identifier is shown in the representation of the seats associated with each Player Terminal. In this example, there is a bank of 8 Player terminals (1) marked with a bank identifier of 1, a bank of 6 terminals marked with a bank identifier of 2, and a set of 14 terminals split into two banks of seven each—these have identifiers of 3 and 4 (indicated by (3)). There are also 14 terminals not currently associated with any banks (indicated by (2)).

Other methods could also be used to represent activity at each Player Terminal—for example, the size of the game icons could vary depending upon player bets or return to casino.

The command buttons shown on the example user interface allow the user to define some of the data used in methods described above. For example, pressing the "Select All" button followed by the "Add Menu Bid" button would allow the user to create a bid entry that would apply to all Player Terminals. Pressing "Select Bank", followed by selecting a bank (e.g. by clicking on any Player Terminal in a bank) and then pressing the "Add Menu Bid" button would allow the user to create a bid entry that would be limited to the selected bank in its application.

Pressing "Add Game" would add a game as available to the selected bank, or all Player Terminals. This would bring up a data entry screen which would allow the user to describe details about the game or import them into the system from files or documents supplied by the game provider.

Pressing the "Add Menu Bid" button would bring up a data entry screen. This screen would allow the user to select a game from those that are available and create a menu bid entry associated with that bid. In the example implementation, the user would input a bid amount, a bid budget, a budget renewal period and also an overall life-time of the bid. The effects of these variables are discussed above with respect to FIG. 4.

Pressing the "Add Idle Bid" button would bring up a data entry screen. This screen would allow the user to select a game from those that are available and create an idle bid entry associated with that bid. In the example implementation, the user would input a bid amount, a bid budget, a budget renewal period and also an overall life-time of the bid. The effects of these variables are discussed above with respect to FIG. 13.

A further data screen could be accessed by the user to generate criteria associated with the bid entry or entries. This data entry screen could also be used to generate criteria associated with the placement of games on a bank, or the placement of games to on idle Player Terminals. An example process for completing this data screen is shown in FIG. 14.

With regards to FIG. 14, after assigning a 'friendly' name to a criteria (such as "Only on Tuesdays"), the user would enable one or more of the following criteria:

(a) Active time—this defines when the associated bid list or game criteria is active. Example values could include "Every day, 24 hours a day", "Between 7 pm and 10 pm each day", "Every Friday and Saturday", "Between 10 am and 12 am on the first Monday of the month". An expiry date is also specified—after this time bids or game rules associated with this criteria are inactive.

(b) Average bet—in the case of bid criteria, this defines the characteristics of a player that would receive this bid; they must have an average bet between the input values. In the case of game criteria, this defines the historical performance in terms of average bet that the game must meet for it to be placed on a bank, or be placed on an idle Player Terminal.

(c) Playline configuration—this defines the range of playline configurations that a player should be playing at least some of the time (this value being set by the trigger percentage) for the bid to be passed to a player, or the playline configuration that a game must support to be placed on a bank, or be placed on an idle Player Terminal.

(d) Denomination—this defines the range of denominations that a player should be playing at least some of the time (this value being set by the trigger percentage) for the bid to be passed to a player, or the denomination that a game must support to be placed on a bank, or be placed on an idle Player Terminal.

(e) Volatility—this is a variable usually unique to each game (or configuration of each game) that describes how frequently a player can be expected to have a winning result when playing the game. In this process, this criterion defines the range of game volatilities that a player should be playing at least some of the time (this value being set by the trigger percentage) for the bid to be passed to a player, or the range of volatilities that a game must meet to be placed on a bank, or be placed on an idle Player Terminal.

(f) Bonusing—bonusing is a feature of certain types of game that possibly links together many Player Terminals to provide large and/or incrementing jackpot(s). In this process, this criterion defines the type of bonusing that a player should be playing at least some of the time (this value being set by the trigger percentage) for the bid to be passed to a player, or the type of bonusing that a game must meet to be placed on a bank, or be placed on an idle Player Terminal.

(g) Game type—this defines the type of a game (e.g. video poker, or even more specifically, "Video Poker, Jacks or Better") that a player should be playing at least some of the time (this value being set by the trigger percentage) for the bid to be passed to a player, or the game type that a game must support to be placed on a bank, or be placed on an idle Player Terminal.

After entering these criteria, the complete criteria record is stored in the criteria list, ready to be associated with bids, banks or idle rules. For example, the "Add menu bid" data entry screen would include a menu to choose from available criteria already defined to be associated with the new bid list.

A further feature of this invention is that it allows the Casino or other operator to assign promotions to certain games. The financial budget for these promotions may come from the operator, the content provider or any other interested party. Possible promotions for a game may include giving all or some selected players free credit play, or increasing the theoretical RTP (return to player) to all or some players for a period of time (or permanently). Another possible feature that may be specified for a game is that particular types of wins or all wins above a certain amount are to be paid not by the operator, but by a content provider or some third party. This would mitigate the risk to a small casino in installing a new game and it paying out a large jackpot fairly soon. Since large jackpots usually account for a small % of the overall RTP, a content provider or maybe an insurance company may be prepared to take this risk on for suitable compensation.

Generation of a possible promotion is shown in FIG. 15. First, a game is selected to be associated with the promotion. Optionally, a set of Player Terminals, or bank(s) of Player Terminals are also associated with the promotion. Next, a set of optional qualifying criteria are included with the promotion. These optional criteria are used during generation of lists for Game Display Menus by the Game List Update Software to qualify players for receiving the promotion.

Some possible criteria are:

a) Average bet—this defines the characteristics of a player that would receive this promotion; they must have an average bet between the input values.

b) Playlines—this defines the range of playline configurations that a player should be playing at least some of the time (this value being set by the trigger percentage) for the promotion to be passed to a player.

c) Denomination—this defines the range of denominations that a player should be playing at least some of the time (this value being set by the trigger percentage) for the promotion to be passed to a player.

d) Minimum play—this defines the amount of money that a player must have wagered over a period of time for the promotion to be passed to the player. For example, A player may have to have bet $1000 over the last month to be eligible.

e) Demographics—this defines the type and range of demographics that a player must meet to receive a promotion. For example a promotion may be limited to only players over 50, or women over 30, or all men, or all players with a reported income of over $50,000.
f) Game type—this defines the type of a game (e.g. video poker, or even more specifically, "Video Poker, Jacks or Better") that a player should be playing at least some of the time (this value being set by the trigger percentage) for the promotion to be passed to a player.
g) Limited within groups—this may cause a promotion to be only targeted at one member of an affiliated group of players (such as a husband and wife). One possible reason for implementing this is the intention that if one player in a group receives a promotion, they will use "word-of-mouth" to promote the game to others in their group.

Once any, some or no criteria have been defined, the benefits of the promotion are defined. Possible benefits include: a) A looseness, in terms of a percentage. This is an increase of RTP (return to player) that eligible players will receive when playing the game in question. When game with such a promotion is made active by a player, the RTP Update Software on the Game Optimisation Software sends a command to the RTP Mapping software to increase the RTP by an appropriate percentage. This causes a) the RTP Mapping software to adjust the RTP by varying suitable configuration settings in the game software. During the period whilst increased RTP is in effect, the Monitoring software on the Game Optimisation Server ensures that the difference in revenue due to increased RTP is accounted for so that the operator may be recompensed by the party paying for the increased RTP if necessary. The Monitoring Software also disables the looseness promotion once the budget for the promotion is met.

b) Free credits. These are free credits that are given to eligible players when they choose a game. Generally, these credits are only give once to a player, and a record is kept of all players that have received the free credits. Optionally, free credits may be given more than once after a time has elapsed (e.g. once per week), and in such a circumstance it is expected that the free credits would not be cumulative (i.e. the credits would be given on a "Use them or lose them" basis). As with looseness, the Monitoring Software transmits a command to the Player Terminal in question when a game with free credits is activated. This command causes the number of free credits specified in the promotion to be added to the player's credit meter. Preferably, it would not be possible to cash out these free credits—it would not be possible to cash out until all of the free credits had been played and exchanged for 'won' credits. So, if a player was playing 10 credits per game, and there were 100 free games, he would not be able to cash out until 10 games had been played. The credits that remained after these 10 games would be his to keep. In the case where a player inserted his or her own credits onto an existing set of free credits, the player would be able to cash out any credits that remained of their own before the free credits were played. Optionally, leaving an active game with free credits causes the credits to be lost (a warning message might be provided to the player in this case to help prevent them doing this), alternatively the Monitoring Software may retrieve the free credits remaining and re-transmit them the next time the same game is active for that player. As for looseness, the Monitoring software on the Game Optimisation Server ensures that the free credits are accounted for so that the operator may be recompensed by the party paying for the free credits if necessary. The Monitoring Software also disables the free credits promotion once the budget for the promotion is met.

c) Promoter paid jackpots. These are promotions that are not presented to the player. A content provider or other interested party such as an insurance company may offer to pay for a particular jackpot prize (e.g. if a winning combination of "3 Red Sevens") is met or for all prizes above a certain amount. As stated above, the reason for offering such a promotion is to mitigate the risk to a small casino operator in installing a game with a very large (but very rare) prize. It is preferred that this type of promotion would not normally have any criteria associated with it except perhaps a time period of validity (say, the first month of a game's installation, or the first 100,000 plays of the game) or a budget. As for other promotions, the Monitoring software on the Game Optimisation Server ensures that the promoter paid jackpots are accounted for so that the operator may be recompensed by the party paying for the jackpots if necessary. The Monitoring Software also disables the promoter paid jackpots promotion once the budget for the promotion is met, or the time period expires. Optionally, if the budget is met, the Monitoring Software may disable each game running the promotion, and remove it from any game menus to ensure that the operator is not exposed to any loss.

As stated above, promotions may be limited by time or budget. Once the time period of the promotion expires, or a set amount of free credits or money returned to players is met the promotion will optionally automatically end.

It should also be noted that promotions need not be dependent upon a game being capable of changing from one game to another. In the case where custom hardware is used for a game, such as a physical stepper-reel type machine, an interested party could still give free credits, pay for adjusted RTP, insure against large jackpots for these machines or any other type of promotion using this method.

Returning to the example shown in FIG. 17, further possible functions performed at the user terminal could include defining banks of machines by means of first pressing the "Define Bank" button. One possible method for achieving this would be for an operator to click on each of the desired icons representing a Player Terminal in turn. Alternatively a mouse based "lasso" method could be used as is common on Microsoft Windows interfaces.

It also should be noted that other functions not shown in FIG. 17 could be performed by the User Terminal. Settings for such features as time-based criteria for favourite game lists and popular game lists could be defined.

It also should be noted that the methods described above concerning bid lists and favourite lists could be used for the presentation of advertising or other material in standalone games—such material could be sent over a standard communications link from the Game Optimisation Server or a Casino Management System. For example, an advertisement for a game could be a scrolling text message across the bottom of the display of another game, or across an LCD or LED screen associated with a stepper machine. These methods could also be used for the presentation of advertising or other materials such as mini-games on peripheral devices such as the player tracking modules, for example the Sentinel III product from Aristocrat Technologies, found in slot machines. These methods could also be used for the presentation of advertising or other materials on signage not attached to any Player Terminals, or for the optimal selection of bonusing links such as Mystery, IGT's Fort Knox or Aristocrat's Hyperlink across a bank of Player Terminals or other slot machines.

A further advantage to all of the methods described above is that at any time the Game Optimisation Server knows for each Player Terminal the games most likely to be played—because these are the games that are present in the highest rankings of the game list menu for that Player Terminal. Because downloading a game necessarily takes time, especially due to the regulatory requirements that games being downloaded must be authenticated and verified to ensure compliance with the law, it is advantageous to cache, or pre-load, a set of games onto each Player Terminal. It is anticipated that it would not be feasible to pre-load every possible game onto each Player Terminal, but by using the output from the methods described in this invention, the rankings of games in the game list menu could be used to determine which games are pre-loaded at any time along with the active game.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for use with a gaming system operating in a casino environment, the gaming system including a plurality of player terminals networked to a game optimisation server, the game optimisation server for providing or allowing a player to access multiple games on each player terminal and for storing in memory a record of the games played on each player terminal, the method comprising:
    allowing a first player to access a first terminal and to request a map of the casino environment;
    sending the request to the game optimisation server, receiving the request at the game optimisation server and responsively sending data related to a physical arrangement of the player terminals, and to the games recently played on the player terminals in a local area, to the first terminal;
    receiving the data at the first terminal;
    displaying, to the first player, using the first terminal, a map illustrating the physical arrangement of the player terminals and a game played on each of the player terminals, thereby indicating to the first player what games are being played at other player terminals where the games being played at other player terminals include at least one game for which the first player is permitted to play a separate instance of that at least one game;
    accepting player input from the first player to initiate the separate instance of that at least one game; and
    initiating the separate instance of that at least one game using the first terminal.

2. The method of claim 1, wherein the map is arranged on the first terminal in a manner that represents the physical arrangement of physical terminals in the casino environment in relation to the first terminal on which the map is being displayed.

3. The method of claim 1, wherein the data from the game optimisation server is updated periodically and sent to the first terminal, the method further comprising updating the map with the updated data.

4. The method of claim 1, wherein the data from the game optimisation server is updated in real time and sent to the first terminal, the method further comprising updating the map with the updated data.

5. The method of claim 1, wherein the first terminal is a first player terminal, the method further comprising:
    allowing the first player to select a second player terminal from the map; and
    changing a current game on the first player terminal to the separate instance of a game being played on the second player terminal.

6. The method of claim 5, further comprising providing an indication of players playing the other player terminals displayed on the map.

7. The method of claim 6, wherein the indication of players includes a name of the player.

8. The method of claim 6, wherein the indication of players includes a unique representation of the player.

9. The method of claim 6, wherein the indication of players includes a graphical representation of the player.

10. The method of claim 1, wherein players may be linked, the map including an indication of any player linked to the particular player or another player.

11. The method of claim 1, further comprising allowing the first player to add information to the player terminals on the map.

12. The method of claim 11, wherein allowing the first player to add information to the player terminals on the map further comprises allowing the first player to tag player terminals on the map with one or more predefined tags.

13. The method of claim 12, wherein the one or more predefined tags includes a favorites tag.

14. The method of claim 1, wherein the gaming system includes a progressive system including a sub-set of the player terminals linked together in a progressive game, the progressive system including at least one progressive display for displaying a current amount of a progressive award, the method further comprising displaying on the map a location of the progressive display relative to the player terminals.

15. The method of claim 14, further comprising providing an indication of the player terminals linked together in the progressive game.

16. The method of claim 1, further comprising displaying on each player terminal on the map one of a current game being played and a previous game played.

17. The method of claim 1, further comprising displaying on the map additional information about a current game on each player terminal.

18. The method of claim 17, wherein the additional information includes a representation of how much a player of a corresponding player terminal has won relative to how much the player of the corresponding player terminal has wagered compared to a mean.

19. The method of claim 18, wherein one player terminal of a predefined set of player terminals is marked being one with a highest amount won relative to how much was wagered.

20. The method of claim 19, wherein another player terminal of the predefined set of player terminals is marked being one with a lowest amount won relative to how much was wagered.

21. The method of claim 1, wherein the map includes an indication of which player terminals are currently being played.

* * * * *